(12) United States Patent  
Kimura

(10) Patent No.: US 7,043,458 B2  
(45) Date of Patent: May 9, 2006

(54) CHARGING PROCESS MANAGEMENT SYSTEM

(75) Inventor: Miki Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 248 days.

(21) Appl. No.: 09/799,019

(22) Filed: Mar. 6, 2001

(65) Prior Publication Data

US 2001/0039498 A1    Nov. 8, 2001

(30) Foreign Application Priority Data

Mar. 6, 2000    (JP)    ............................. 2000-061044

(51) Int. Cl.  
*G06F 17/60*    (2006.01)

(52) U.S. Cl. .......................... 705/400; 705/32; 705/52; 719/310; 709/224

(58) Field of Classification Search ................ 705/30, 705/32, 400, 52, 53; 709/208, 209, 224; 717/177; 719/319, 310  
See application file for complete search history.

(56) References Cited

U.S. PATENT DOCUMENTS

| | | | | |
|---|---|---|---|---|
| 5,155,680 | A * | 10/1992 | Wiedemer | 705/52 |
| 5,386,369 | A * | 1/1995 | Christiano | 705/400 |
| 5,388,211 | A * | 2/1995 | Hornbuckle | 717/178 |
| 5,761,651 | A * | 6/1998 | Hasebe et al. | 705/400 |
| 5,870,726 | A * | 2/1999 | Lorphelin | 705/400 |
| 6,411,943 | B1 * | 6/2002 | Crawford | 705/400 |
| 6,516,304 | B1 * | 2/2003 | Yoshimura | 705/52 |
| 6,532,488 | B1 * | 3/2003 | Ciarlante et al. | 709/205 |

FOREIGN PATENT DOCUMENTS

| | | | |
|---|---|---|---|
| JP | 01248725 | A * | 10/1989 |
| JP | 7-007570 | | 1/1995 |
| JP | 9-244974 | | 9/1997 |
| JP | 11-134058 | | 5/1999 |
| JP | 11-157179 | | 6/1999 |

OTHER PUBLICATIONS

"Oneworld Systems: Oneworld Systems Ships Landmark All-In-One Communications Server for Small and Medium Businesses", Business Wire, Sep. 29, 1998.*

* cited by examiner

*Primary Examiner*—F. Zeender  
(74) *Attorney, Agent, or Firm*—Oblon, Spivak, McClelland, Maier & Neustadt, P.C.

(57) ABSTRACT

A charging process management system includes image input/output devices which are connected to a network, each image input/output device having software components that are charged for service fees. A broker is connected to the image input/output devices through the network, the broker providing integrated management and services to the image input/output devices. A service center is connected to the broker through the network, the service center collecting charging information through the broker, the charging information being generated according to respective use conditions of the software components of the image input/output devices. In the management system, when adding a new image input/output device to the management system, either the service center or the new image input/output device transmits a request to the broker, so that software components of the new image input/output device are registered to the broker as charged objects.

11 Claims, 20 Drawing Sheets

CHARGING PROCESS MANAGEMENT SYSTEM

BACKGROUND OF THE INVENTION

1. Field of The Invention

The present invention relates to a charging process management system in which a plurality of image input/output devices, such as copiers, scanners or printers, are connected to a broker through a network, the broker providing integrated management and services for the image input/output devices, and a service center being connected to the broker through the network.

2. Description of The Related Art

As disclosed in Japanese Laid-Open Patent Application No. 9-244974, a concept of a distributed management system using plural managers is known. In the system of the above document, a storage unit that stores basic management request processing information is incorporated into a management request broker. When management applications in the management request broker are increased or decreased or the service functions of management applications in the management request broker are changed, only the basic management request processing information of the storage unit is updated according to the changes and the need to change the other managers is eliminated. Also, Japanese Laid-Open Patent Application No. 7-7570 discloses a similar management system.

However, in the conventional systems of the above documents, the management of a charging process for software components included in each of a plurality of image input/output devices as well as the management of a charging process for the hardware of each image input/output device is not taken into consideration.

Japanese Laid-Open Patent Application No. 11-157179 discloses an image processing system which receives an image forming data and a print job data, included in a specified image processing procedure, from a host computer. A control unit of the image processing system controls image formation according to the received procedure and communicates with an external record management unit according to the received procedure. Based on the communication results, the print job is controlled and the contents of the received procedure are changed so that the control procedure for forming an image is modified flexibly.

However, in the conventional system of the above document, the management of a charging process for software components included in the image processing system as well as the management of a charging process for the hardware of the image processing system is not taken into consideration.

Japanese Laid-Open Patent Application No. 11-134058 discloses a charging process management system for document processing devices. In the system of the above document, an input charging unit performs a charging process according to the contents of input documents that are input to the system. A document processing charging unit performs a charging process according to the contents of the document processing performed for the input documents in the system. An output charging unit performs a charging process according to the contents of output documents that are output from the system. An integrated charging unit performs an integrated charging process that integrates the charging results of the respective charging units.

However, in the conventional system of the above document, the management of a charging process for software components included in each of a plurality of image input/output devices as well as the management of a charging process for the hardware of each image input/output device is not taken into consideration.

Conventionally, in a distributed management system in which a plurality of image input/output devices are connected to a network, only the management of the charging process for the hardware of each image input/output device has been performed. In other words, the users are charged on an as-used basis with respect to only the use of the hardware of each image input/output device. However, in many cases, the users have not been charged with respect to the use of the software components of each image input/output device. Namely, the management of the charging process for the software components included in each image input/output device is not taken into consideration in the conventional distributed management system.

Further, in the conventional distributed management system described above, when a new image input/output device is registered to the system, only the registration for the hardware of the new image input/output device has been performed. However, in many cases, the registration of software components in the new image input/output device has not been performed. Hence, the management of the charging process for the software components in the new image input/output device is not taken into consideration in the conventional distributed management system, and the management to restrict the use of the software components in the new image input/output device has been inadequate.

SUMMARY OF THE INVENTION

It is an object of the present invention to provide an improved charging process management system in which the above-described problems are eliminated.

Another object of the present invention is to provide a charging process management system that provides integrated management of the charging process for the individual software components included in the image input/output devices.

Another object of the present invention is to provide a charging process management system that simplifies the management processes to add newly charged objects or to alter the charging information.

Another object of the present invention is to provide a charging process management system that provides simplified management processes to add newly charged objects or to alter the charging information with no need for the service man to visit the customer system.

Another object of the present invention is to provide a charging process management system that provides simplified management processes to add newly charged objects or to alter the charging information without causing customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to respective use conditions of the software components of the image input/output devices, wherein the service center transmits a request to the broker when adding a new image input/output device to the management system, so that one or a plurality of software components of the new image input/output device are registered to the broker as charged objects.

In the charging process management system of the present invention, the service center transmits a request to the broker when adding a new image input/output device to the management system, so that one or a plurality of software components of the new image input/output device are registered to the broker as charged objects. It is possible for the present invention to provide integrated management of the charging process for the individual software components included in the image input/output devices. The charging process management system of the present invention is effective in simplifying the management processes to add newly charged objects or to alter the charging information. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to respective use conditions of the software components of the image input/output devices, wherein, when adding a new image input/output device to the management system, the new image input/output device transmits a request to the broker so that one or a plurality of software components of the new image input/output device are registered to the broker as charged objects.

In the charging process management system of the present invention, when adding a new image input/output device to the management system, the new image input/output device transmits a request to the broker so that one or a plurality of software components of the new image input/output device are registered to the broker as charged objects. It is possible for the present invention to provide integrated management of the charging process for the individual software components included in the image input/output devices. The charging process management system of the present invention is effective in simplifying the management processes to add newly charged objects or to alter the charging information. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to respective use conditions of the software components of the image input/output devices, wherein the service center transmits a request to the broker when one of the software components is upgraded to a new version and the charging information is varied, so that the broker updates the charging information with respect to the new-version software component of a corresponding one of the image input/output devices.

In the charging process management system of the present invention, the service center transmits a request to the broker when one of the software components is upgraded to a new version and the charging information is varied, so that the broker updates the charging information with respect to the new-version software component of a corresponding one of the image input/output devices. It is possible for the present invention to provide integrated management of the charging process for the individual software components included in the image input/output devices. The charging process management system of the present invention is effective in simplifying the management processes to add newly charged objects or to alter the charging information. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to a use status of each of the respective image input/output devices, wherein, when one of the software components is upgraded to a new version and the charging information is varied, a corresponding one of the image input/output devices transmit a request to the broker, so that the broker updates the charging information with respect to the new-version software component of the corresponding one of the image input/output devices.

In the charging process management system of the present invention, when one of the software components is upgraded to a new version and the charging information is varied, a corresponding one of the image input/output devices transmit a request to the broker, so that the broker updates the charging information with respect to the new-version software component of the corresponding one of the image input/output devices. It is possible for the present invention to provide integrated management of the charging process for the individual software components included in the image input/output devices. The charging process management system of the present invention is effective in simplifying the management processes to add newly charged objects or to alter the charging information. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to respective use conditions of the software components of the image input/output devices, wherein the service center transmits a request to the broker when adding a new software component of a corresponding one of the image input/output devices to the management system, so that the broker updates the charging information with respect to the new software component of the corresponding one of the image input/output devices.

In the charging process management system of the present invention, the service center transmits a request to the broker when adding a new software component of a corresponding one of the image input/output devices to the management system, so that the broker updates the charging information with respect to the new software component of the corresponding one of the image input/output devices. The charging process management system of the present invention is effective in simplifying the management processes to add newly charged objects or to alter the charging information. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to a use status of each of the respective image input/output devices, wherein, when adding a new software component of a corresponding one of the image input/output devices to the management system, the corresponding one of the image input/output devices transmits a request to the broker so that the broker updates the charging information with respect to the new software component of the corresponding one of the image input/output devices.

In the charging process management system of the present invention, when adding a new software component of a corresponding one of the image input/output devices to the management system, the corresponding one of the image input/output devices transmits a request to the broker so that the broker updates the charging information with respect to the new software component of the corresponding one of the image input/output devices. The charging process management system of the present invention is effective in simplifying the management processes to add newly charged objects or to alter the charging information. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to respective use conditions of the software components of the image input/output devices, wherein the service center provides registration and management functions of user identifications, each user identification indicating a specific one of registered users for one of the software components of the image input/output devices.

In the charging process management system of the present invention, the service center provides registration and management functions of user identifications, each user identification indicating a specific one of registered users for one of the software components of the image input/output devices. The charging process management system of the present invention is effective in simplifying the management processes to add newly charged objects or to alter the charging information and in providing detailed management for the software components of the image input/output devices. It is unnecessary for the service man to visit the customer system, and the simplified management processes of the present invention do not require additional customer efforts.

The above-mentioned objects of the present invention are achieved by a charging process management system comprising: a plurality of image input/output devices which are connected to a network, each image input/output device having one or a plurality of software components that are charged for service fees; a broker which is connected to the plurality of image input/output devices through the network, the broker providing integrated management and services to the image input/output devices; and a service center which is connected to the broker through the network, the service center collecting charging information through the broker, the charging information being generated according to respective use conditions of the software components of the image input/output devices, wherein the service center provides registration and management functions of user identifications, each user identification indicating a specific one of registered users for one of the software components of the image input/output devices, wherein, when one of the software components is used by one of the registered users, the broker identifies the one of the registered users by using the corresponding user identification and updates the charging information of the one of the registered users according to the use condition of the one of the software components.

In the charging process management system of the present invention, the service center provides registration and management functions of user identifications, each user identification indicating a specific one of registered users for one of the software components of the image input/output devices, and, when one of the software components is used by one of the registered users, the broker identifies the one of the registered users by using the corresponding user identification and updates the charging information of the one of the registered users according to the use condition of the one of the software components. The charging process management system of the present invention is effective in simplifying the management processes to add newly charged objects or to alter the charging information and in providing detailed management for the software components of the image input/output devices. It is unnecessary for the service man to visit the customer system, and the simplified management processes of the present invention do not require additional customer efforts.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the charging process management system of the present invention with reference to the accompanying drawings.

Figure 1:
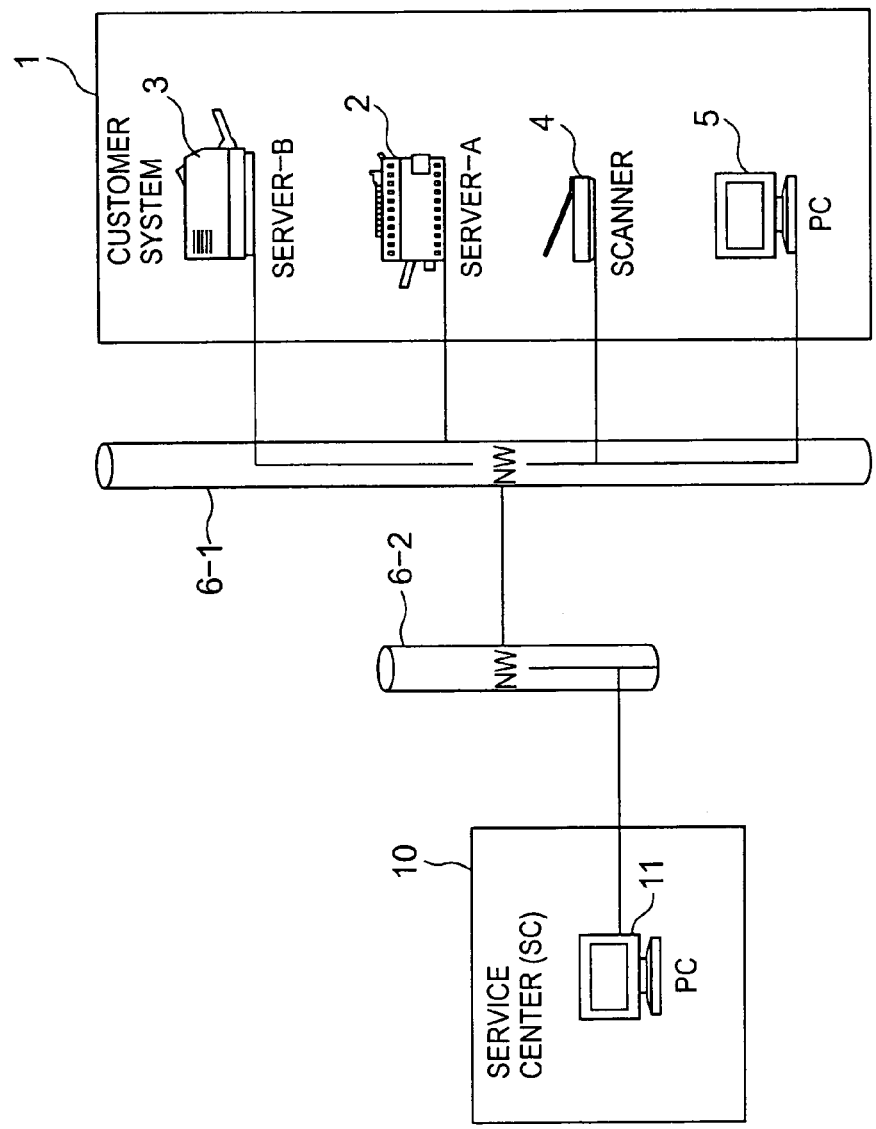
FIG. 1 is a block diagram of a first preferred embodiment of the charging process management system of the invention.

FIG. 1 shows a configuration of a first preferred one embodiment of the charging process management system of the invention.

As shown in FIG. 1, in the charging process management system of the present embodiment, a customer system 1 generally includes a plurality of image input/output devices 2, 3 and 4, and a personal computer (PC) 5, which are connected to a first network (NW) 6-1. Specifically, in the present embodiment, the image input/output device 2 is a server-A which may be a selected one of a copier, a printer and a facsimile, the image input/output device 3 is a server-B which may be a selected one of a copier, a printer and a facsimile, and the image input/output device 4 is a scanner. These image input/output devices 2 through 4 of the customer system 1 are operated in accordance with the software components of each corresponding device.

In the charging process management system of FIG. 1, a service center (SC) 10 includes a personal computer (PC) 11, which is connected to a second network (NW) 6-2. The first network 6-1 and the second network 6-2 are connected together, and the PC 11 of the SC 10 is connected to the individual image input/output devices 2 through 4 of the customer system 1 through the first network 6-1 and the second network 6-2. By communicating with the customer system 1, the SC 10 remotely provides operational and message services for the individual image input/output devices 2 through 4 of the customer system 1.

The SC 10 manages user information related to the respective image input/output devices 2 through 4 of the customer system 1, in addition to the existing system information.

Figure 2:
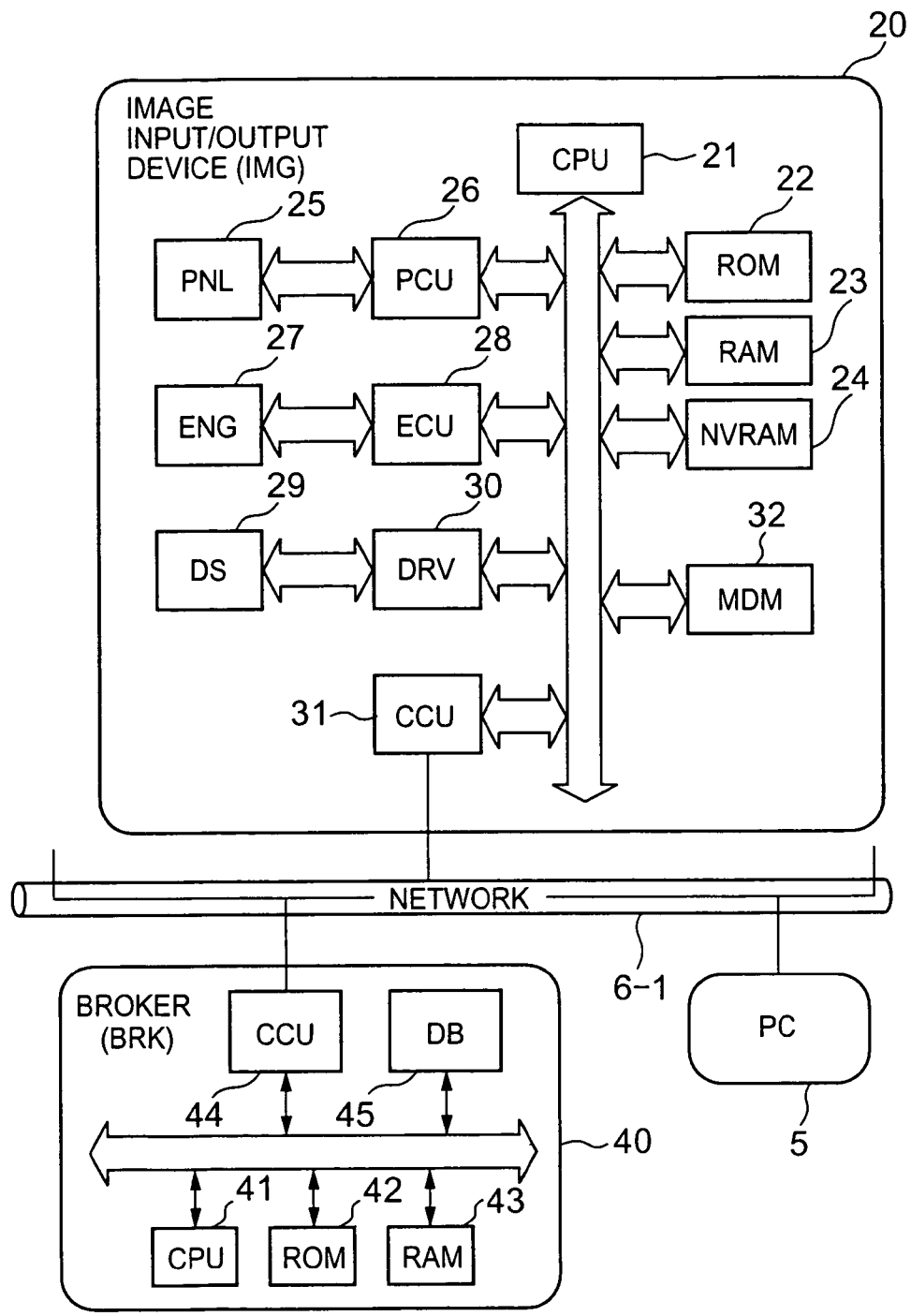
FIG. 2 is a block diagram for explaining a configuration of the hardware of one of a plurality of image input/output devices in the charging process management system of the present embodiment.

FIG. 2 shows a configuration of the hardware of one of the image input/output devices 2 through 4 in the charging process management system of the present embodiment. In FIG. 2, an arbitrary one of the image input/output devices 2 through 4 of the customer system 1 is designated by reference numeral 20, and, hereinafter, this image input/output device 20 will be called the IMG 20 for the sake of convenience.

As shown in FIG. 2, in the charging process management system of the present embodiment, the IMG 20, the PC 5 and a broker 40 are connected to the network 6-2.

The image input/output device (IMG) 20 generally includes a CPU (central processing unit) 21, a ROM (read-only memory) 22, a RAM (random access memory) 23, a NVRAM (non-volatile RAM)2 through 4, a display/input panel (PNL) 25, a panel control unit (PCU) 26, a scan/print engine unit (ENG) 27, an engine control unit (ECU) 28, a disk storage unit (DS) 29, a disk driver (DRV) 30, a communication control unit (CCU) 31, and a modem (MDM) 32. The CPU 21 controls the elements 22–32 of the entire IMG 20.

In the IMG 20 of FIG. 2, the ROM 22 stores program code instructions, font data and other static data, in advance. The RAM 23 provides temporary storage areas of data when the CPU 21 executes the program from the ROM 22. The NVRAM 24 retains its contents when a power switch of the IMG 20 is turned off. The display/input panel (PNL) 25 and the panel control unit (PCU) 26 provide interface between the IMG 20 and the user, and the display information of the PNL 25 related to operational conditions of the IMG 20 is viewed by the user, and the user's instructions are input from the PNL 25 to the IMG 20. The scan/print engine unit (ENG) 27 and the engine control unit (ECU) 28 perform reading and printing of image data, including optical reading of image data from a document and printing of an image onto a copy sheet. The disk storage unit (DS) 29 and the disk driver (DRV) 30 store a large amount of image data or the like and stores database related to user information. The communication control unit (CCU) 31 connects the IMG 20 to the network 6-2 so as to provide communications between the IMG 20 and an external device on the network 6-2. The modem (MDM) 32 connects the IMG 20 to a public switched telephone network (PSTN) so as to provide communications between he IMG 20 and an external device on the PSTN.

As shown in FIG. 2, the broker 40 is connected to the network 6-2. The broker 40 is formed as a middleware that retains necessary function information and management information for the image input/output devices 2 through 4 connected to the network 6-2, and establishes connection between the server (one of the image input/output devices 2 through 4) and the personal computer (the PC 5) through the network 6-2. The broker 40 generally includes a CPU (central processing unit) 40, a ROM (read-only memory) 42, a RAM (random access memory) 43, a communication control unit (CCU) 44, and a database (DB) 45. With these elements 41–45, the broker 40 provides integrated management and services to the image input/output devices 2 through 4 in the customer system 1.

In the present embodiment, the broker 40 is provided as a component that is separate from the IMG 20 and the PC 5. Alternatively, the broker 40 may be provided as an integral component that is contained in either the IMG 20 or the PC 5.

Figure 3:
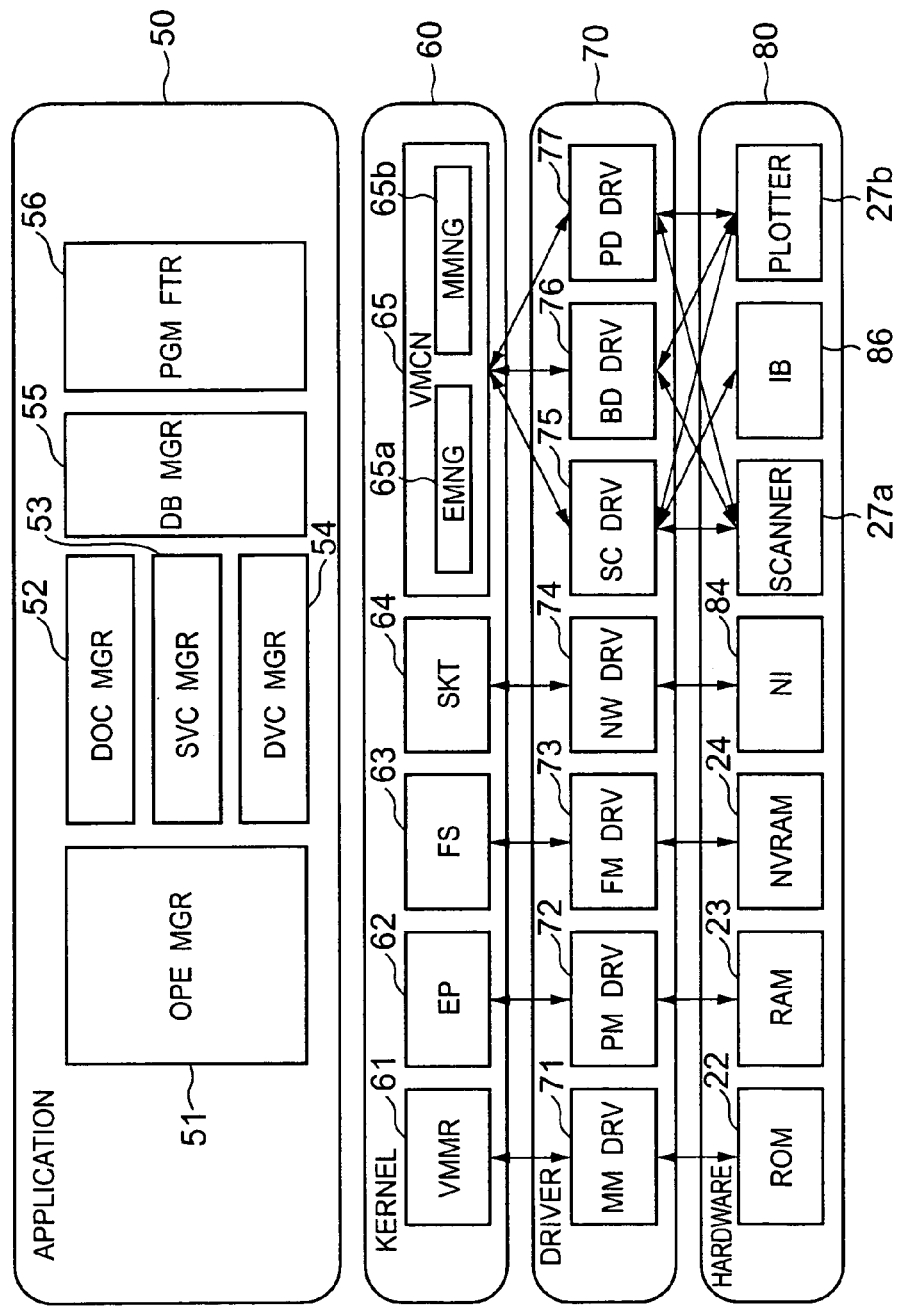
FIG. 3 is a block diagram for explaining a configuration of the software of each of the image input/output devices in the charging process management system of the present embodiment.

FIG. 3 shows a configuration of the software of each of the image input/output devices 2 through 4 in the charging process management system of the present embodiment.

As shown in FIG. 3, the software of each of the image input/output devices 2 through 4 is classified into four major layers: application layer 50, kernel layer 60, driver layer 70 and hardware layer 80. The application layer 50 constitutes a plurality of copier, fax and printer application programs contained in the IMG 20 (or the corresponding one of the image input/output devices 2 through 4 in the customer system 1). The application layer 50 generally includes an operation manager (OPE MGR) 51, a document manager (DOC MGR) 52, a service manager (SVC MGR) 53, a device manager (DVC MGR) 54, a database manager (DB MGR) 55, and a program factory (PGM FTR) 56. The hardware layer 80 is a physical layer providing interface with the hardware of the corresponding image input/output device, which generally includes the ROM 22, the RAM 23, the NVRAM 24, a network interface (NI) 84, a scanner 27a, an image bus (IB) 86, and a plotter 27b.

In the application layer 50 of FIG. 3, the document manager 52 provides document handling functions associated with the copier, fax and printer application programs. The service manager 53 provides management and execution functions of various services that are required in common when the document handling functions are performed by the document manager 52. The device manager 54 provides management and execution functions of various services that are used to determine operations of the physical devices including the scanner 27a, the plotter 27b, the image bus 86 and the like of the hardware layer 80. The operation manager 51 provides control functions to control the display/input panel 25 as shown in FIG. 2 and performs the button displaying, the button operation notification and the alert messaging. The database manager 55 provides management and maintenance functions of permanent data, including fonts, routine forms, fax reception records, device use records, charging data and so on. Further, the database manager 55 provides management and maintenance functions of the software components, the charging information thereof, the carryover service fees and so on.

The program factory 56 provides initializing functions of the software components in the corresponding image input/output device 20 before program execution. The program factory 56 loads each software component from the ROM 22 into the RAM 23 (or instance generation according to the object-oriented programming), and, after a certain message (or a method call according to the object-oriented programming) is received, the program factory 56 keeps the loaded software component in an execution state.

The kernel layer 60 is normally incorporated into the software of the IMG 20. The kernel layer 60 generally includes a virtual memory (VMMR) 61, an execution process (EP) 62, a file system (FS) 63, a socket (SKT) 64 and a virtual machine (VMCN) 65, and provides services of the virtual elements to the application layer 50. The virtual machine 65 includes an execution managing portion (EMNG) 65a and a mode managing portion (MMNG) 65b. The application layer 50 gives a system call to the kernel layer 60, and it is operated.

The driver layer 70 generally includes a memory managing driver (MM DRV) 71, a process managing driver (PM DRV) 72, a file managing driver (FM DRV) 73, a network driver (NW DRV) 74, a single-copy driver (SC DRV) 75, a blocking device driver (BD DRV) 76, and a paging device driver (PD DRV) 77. The elements of the driver layer 70 provide drive control functions for the hardware of the IMG 20.

As described above, the hardware layer 80 generally includes the ROM 22, the RAM 23, the NVRAM 24, the network interface (NI) 84, the scanner 27a, the image bus (IB) 86 and the plotter 27b. The hardware layer 80 is a set of the controllable resources contained in the IMG 20.

Rollers, actuators or motors and sensors of a sheet transport mechanism of the IMG 20 are contained in the hardware layer 80.

A description will now be given of various operations of the charging process management system of the present embodiment.

Figure 4:
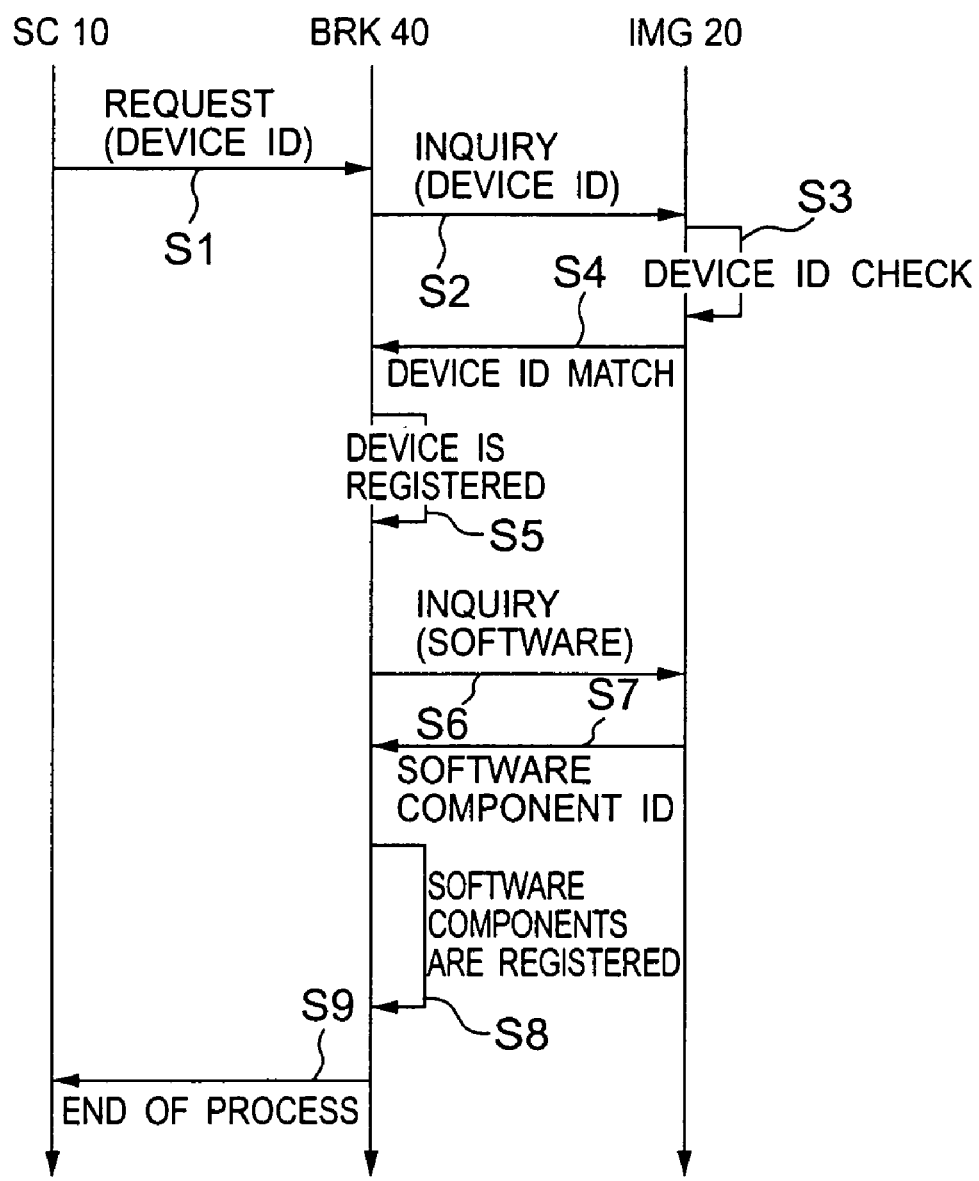
FIG. 4 is a diagram for explaining a communication sequence of a service center, a broker and the image input/output device in the charging process management system of the present embodiment.

FIG. 4 shows a communication sequence of the service center (the SC 10), the broker (the BRK 40) and the image input/output device (the IMG 20) in the charging process management system of the present embodiment when adding a new image input/output device to the management system.

As shown in FIG. 4, in the present embodiment, when adding a new image input/output device (which will be called the IMG 20) to the management system, the SC 10 transmits a new device addition request to the BRK 40 (S1). The transmitted request contains a new device ID indicating the new image input/output device. The BRK 40 receives the new device ID contained in the request sent by the SC 10. The BRK 40 transmits a new device ID inquiry to all the image input/output devices in the management system based on the device ID (S2), and determines whether the new device ID of the request matches with any among the device IDs returned from the image input/output devices (S3). When there is a match, the IMG 20 transmits a notice of the match back to the BRK 40 in response to the inquiry (S4).

After the notice from the IMG 20 is received, the BRK 40 registers the new image input/output device (the IMG 20) to the management system (S5). The BRK 40 transmits a software component inquiry to the IMG 20 (S6). The IMG 20 transmits a notice of the software components, included in the IMG 20, to the BRK 40 in response to the inquiry (S7). The software components will be charged for service fees according to the use condition of each software component. The notice, sent by the IMG 20, contains respective software component IDs of these software components and other information.

After the notice from the IMG 20 is received, the BRK 40 registers the software components of the IMG 20 to the management system as the charged objects (S8). After the registration of the software components is performed, the BRK 40 transmits a notice of the end of the new device addition process to the SC 10 (S9).

Figure 5:
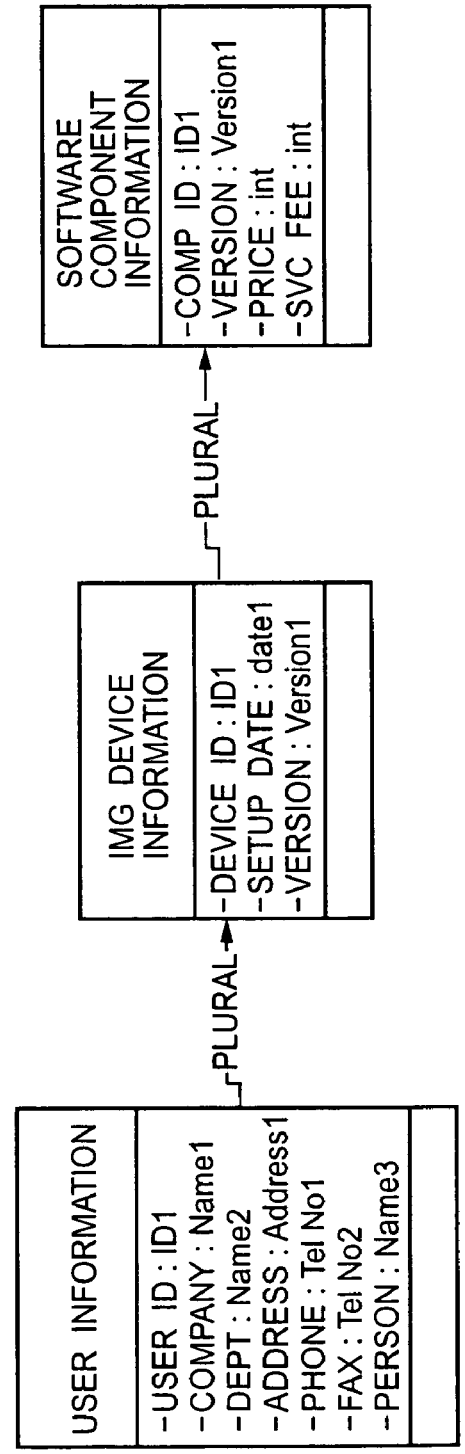
FIG. 5 is a diagram for explaining a structure of management information retained by the broker in the charging process management system of the present embodiment.

FIG. 5 shows a structure of management information retained by the broker (the BRK 40) in the charging process management system of the present embodiment.

As shown in FIG. 5, the BRK 40 retains user information, image input/output device information, and software component information in order for the charging process management. In the present embodiment, the user information includes a user ID field (ID1), a company name field (Name1), a department name field (Name2), an address field (Address1), a telephone number field (TelNo1), a fax number field (TelNo2), and a person-in-charge name field (Name3). Hereinafter, the notations in parentheses show examples of the actual data contained in the respective fields.

In the management information of FIG. 5, the image input/output device information includes a device ID field (ID1), a setup date field (date1), and a version number field (Version1). The software component information includes a component ID field (ID1), a version number field (Version1), a price field (int), and a current service fee field (int).

Normally, in the management information of FIG. 5, a plurality of items of image input/output device information are created with respect to one of a plurality of items of user information, and a plurality of items of software component information are created with respect to one of the plurality of items of image input/output device information.

When the SC 10 transmits a new device addition request to the BRK 40 as in the communication sequence of FIG. 4, the BRK 40 creates a new item of image input/output device information (the new device ID) and new items of software component information (the software component IDs) and registers them to the management information shown in FIG. 5 by adding the new items thereto.

Figure 6:
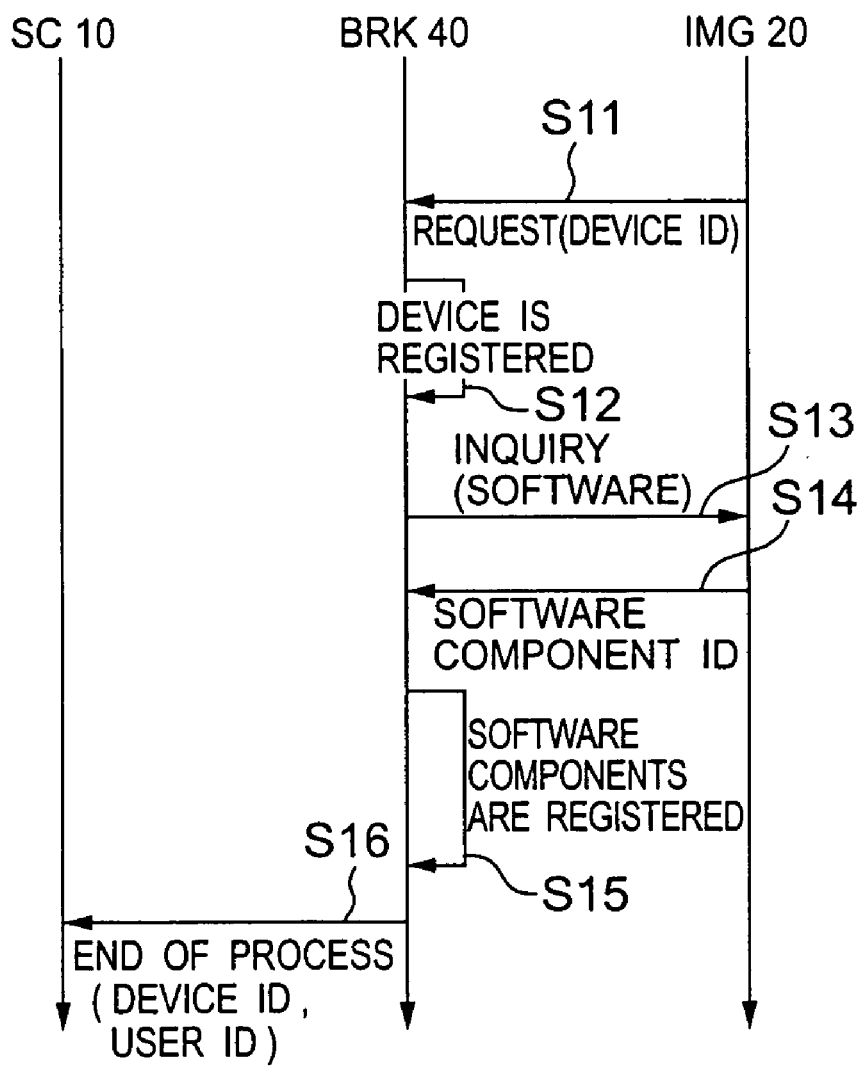
FIG. 6 is a diagram for explaining a communication sequence of the service center, the broker and the image input/output device in the charging process management system of the present embodiment.

FIG. 6 shows another communication sequence of the service center 10, the broker 40 and the image input/output device 20 in the charging process management system of the present embodiment when adding a new image input/output device to the management system.

As shown in FIG. 6, in the present embodiment, when adding a new image input/output device (which will be called the IMG 20) to the management system, the IMG 20 transmits a new device addition request to the BRK 40 (S11). The transmitted request contains a new device ID indicating the new image input/output device (the IMG 20). The BRK 40 receives the new device ID contained in the request sent by the IMG 20. The BRK 40 registers the new image input/output device (the IMG 20) to the management system (S12). The BRK 40 transmits a software component inquiry to the IMG 20 (S13). The IMG 20 transmits a notice of the software components, included in the IMG 20, to the BRK 40 in response to the inquiry (S14). The software components will be charged for service fees according to the use condition of each software component. The notice, sent by the IMG 20, contains respective software component IDs of these software components and other information.

After the notice from the IMG 20 is received, the BRK 40 registers the software components of the IMG 20 to the management system as the charged objects (S15). After the registration of the software components is performed, the BRK 40 transmits a notice of the end of the new device addition process to the SC 10 (S16). The notice, sent by the BRK 40, contains the new device ID and the user ID.

Figure 7:
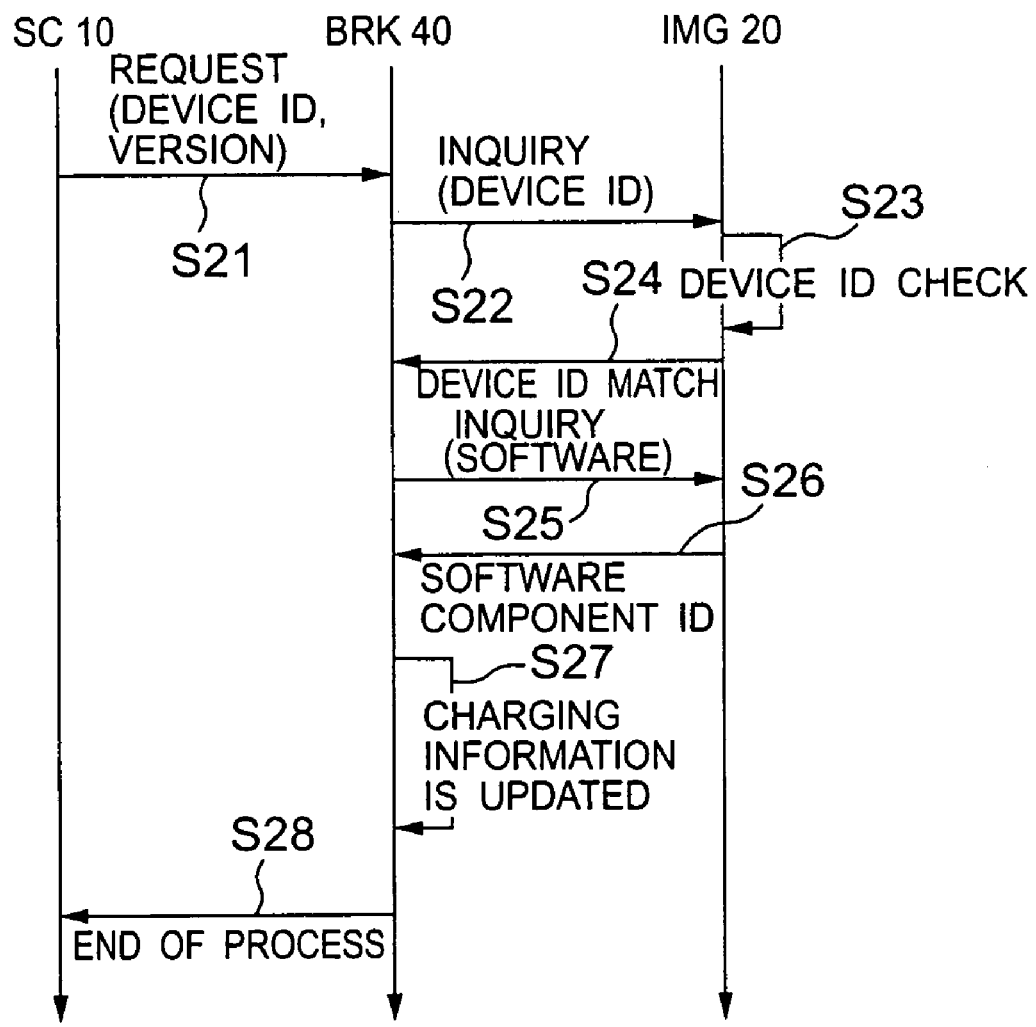
FIG. 7 is a diagram for explaining a communication sequence of the service center, the broker and the image input/output device in the charging process management system of the present embodiment.

FIG. 7 shows another communication sequence of the service center 10, the broker 40 and the image input/output device 20 in the charging process management system of the present embodiment when one of the software components is upgraded to a new version and the charging information is varied.

As shown in FIG. 7, in the present embodiment, when one of the software components of a corresponding image input/output device (which will be called the IMG 20) is upgraded to a new version and the charging information is varied, the SC 10 transmits a software component upgrading request to the BRK 40 (S21). The transmitted request contains a device ID, indicating the IMG 20, and the new version to which the corresponding software component is updated. The BRK 40 receives the device ID contained in the request sent by the SC 10. The BRK 40 transmits a device ID inquiry to all the image input/output devices in the management system based on the device ID of the request (S22), and determines whether the device ID of the request matches with any among the device IDs returned from the image input/output devices (S23). When there is a match, the IMG 20 transmits a notice of the match back to the BRK 40 in response to the inquiry (S24).

After the notice from the IMG 20 is received, the BRK 40 transmits a software component inquiry to the IMG 20 (S25). The IMG 20 transmits a notice of the upgraded software component, included in the IMG 20, to the BRK 40 in response to the inquiry (S26). The notice, sent by the IMG 20, contains the upgraded software component ID, the new version, and charging information of the new version software component.

After the notice from the IMG 20 is received, the BRK 40 updates the charging information related to the upgraded software component of the IMG 20 (S27). Specifically, the BRK 40 overwrites the corresponding items of the image input/output device information and the software component information, retained by the BRK 40 as shown in FIG. 5, based on the new information contained in the received notice. After the charging information is updated, the BRK 40 transmits a notice of the end of the software component upgrading process to the SC 10 (S28).

Figure 8:
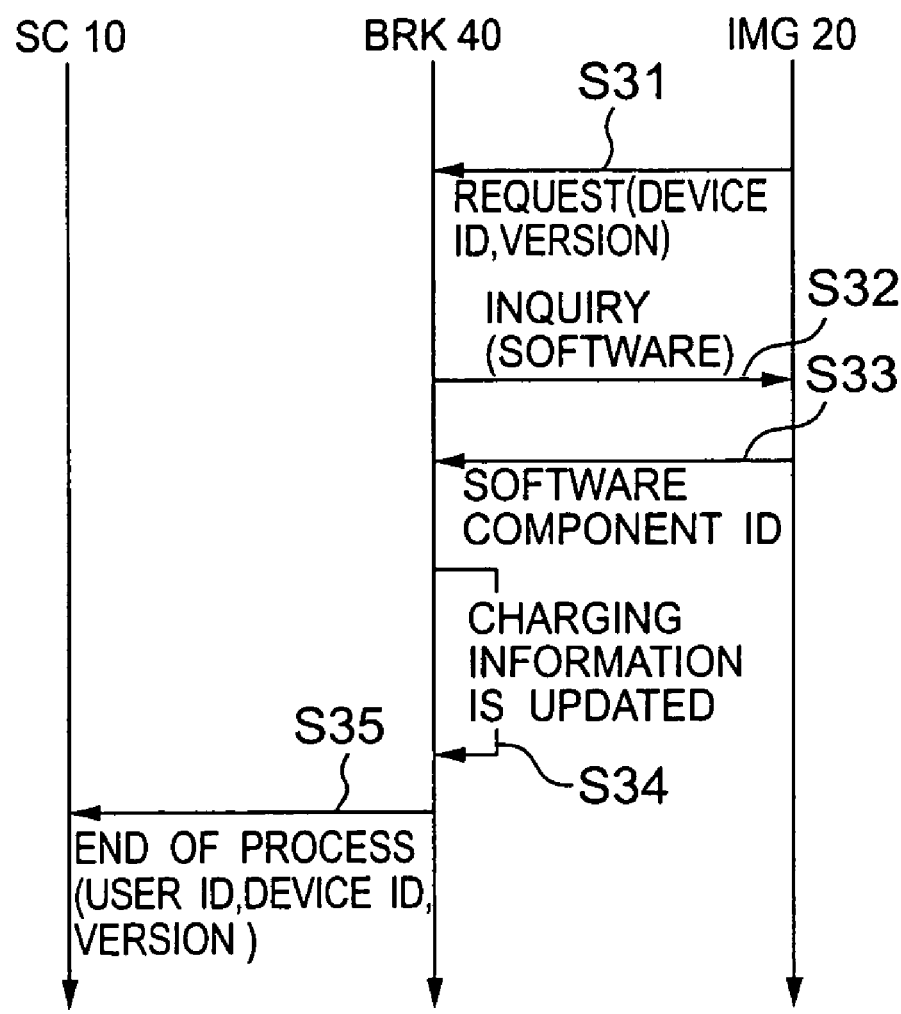
FIG. 8 is a diagram for explaining a communication sequence of the service center, the broker and the image input/output device in the charging process management system of the present embodiment.

FIG. 8 shows another communication sequence of the service center 10, the broker 40 and the image input/output device 20 in the charging process management system of the present embodiment when one of the software components is upgraded to a new version and the charging information is varied.

As shown in FIG. 8, in the present embodiment, when one of the software components of a corresponding image input/output device (which will be called the IMG 20) is upgraded to a new version and the charging information is varied, the IMG 20 transmits a software component upgrading request to the BRK 40 (S31). The transmitted request contains a device ID, indicating the IMG 20, and the new version to which the corresponding software component is updated. After the request from the IMG 20 is received, the BRK 40 transmits a software component inquiry to the IMG 20 (S32). The IMG 20 transmits a notice of the upgraded software component, included in the IMG 20, to the BRK 40 in response to the inquiry (S33). The notice, sent by the IMG 20, contains the upgraded software component ID, the new version, and charging information of the new version software component.

After the notice from the IMG 20 is received, the BRK 40 updates the charging information related to the upgraded software component of the IMG 20 (S34). Specifically, the BRK 40 overwrites the corresponding items of the image input/output device information and the software component information, retained by the BRK 40 as shown in FIG. 5, based on the new information contained in the received notice. After the charging information is updated, the BRK 40 transmits a notice of the end of the software component upgrading process to the SC 10 (S35). The notice, sent by the BRK 40, contains the user ID, the device ID and the new version.

Figure 9:
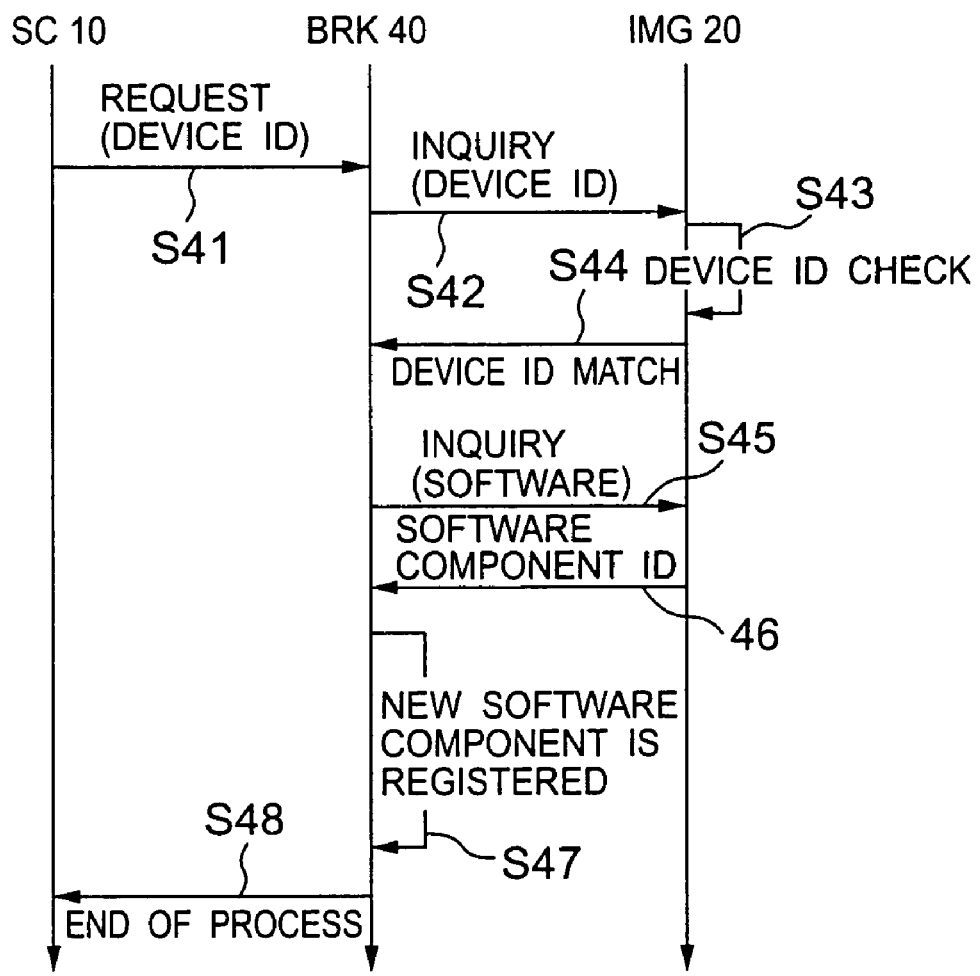
FIG. 9 is a diagram for explaining a communication sequence of the service center, the broker and the image input/output device in the charging process management system of the present embodiment.

FIG. 9 shows another communication sequence of the service center 10, the broker 40 and the image input/output device 20 in the charging process management system of the present embodiment when a new software component of a corresponding image input/output device is added to the management system.

As shown in FIG. 9, in the present embodiment, when a new software component of a corresponding image input/output device (which will be called the IMG 20) is added to the management system, the SC 10 transmits a new software component addition request to the BRK 40 (S41). The request, sent by the SC 10, contains a device ID which indicates the IMG 20. The BRK 40 receives the device ID contained in the request sent by the SC 10. The BRK 40 transmits a device ID inquiry to all the image input/output devices in the management system based on the device ID of the request (S42), and determines whether the device ID of the request matches with any among the device IDs returned from the image input/output devices (S43). When there is a match, the IMG 20 transmits a notice of the match to the BRK 40 in response to the inquiry (S44).

After the notice from the IMG 20 is received, the BRK 40 transmits a software component inquiry to the IMG 20 (S45). The IMG 20 transmits a notice of the new software component, included in the IMG 20, to the BRK 40 in response to the inquiry (S46). The notice, sent by the IMG 20, contains the new software component ID, the version thereof, and charging information of the new software component.

After the notice from the IMG 20 is received, the BRK 40 registers the new software component of the IMG 20 to the management system as the charged object (S47). Specifically, the BRK 40 overwrites the corresponding items of the image input/output device information and the software component information, retained by the BRK 40 as shown in FIG. 5, based on the new information contained in the received notice. After the charging information is updated, the BRK 40 transmits a notice of the end of the software component upgrading process to the SC 10 (S48).

Figure 10:
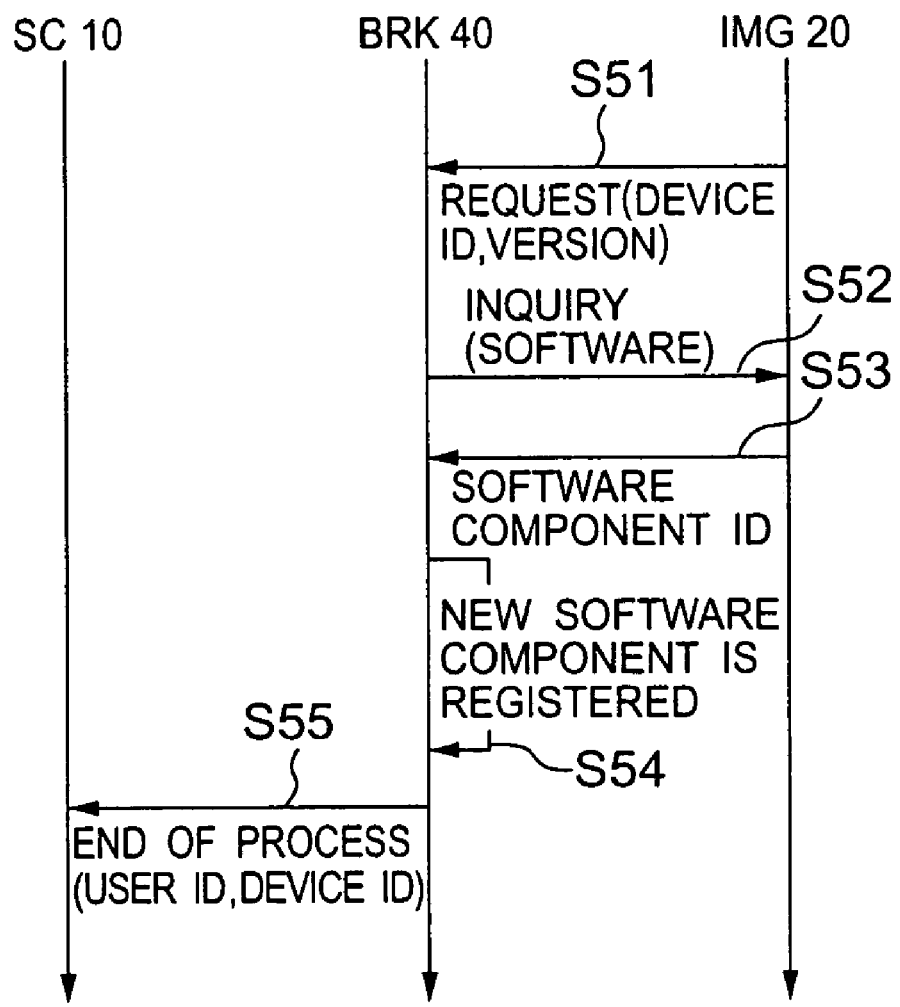
FIG. 10 is diagram for explaining a communication sequence of the service center, the broker and the image input/output device in the charging process management system of the present embodiment.

FIG. 10 shows another communication sequence of the service center 10, the broker 40 and the image input/output device 20 in the charging process management system of the present embodiment when a new software component of a corresponding image input/output device is added to the management system.

As shown in FIG. 10, in the present embodiment, when a new software component of a corresponding image input/output device (which will be called the IMG 20) is added to the management system, the IMG 20 transmits a new software component addition request to the BRK 40 (S51). The request, sent by the IMG 20, contains a device ID, which indicates the IMG 20, and the version of the new software component.

After the request from the IMG 20 is received, the BRK 40 transmits a software component inquiry to the IMG 20 (S52). The IMG 20 transmits a notice of the new software component, included in the IMG 20, to the BRK 40 in response to the inquiry (S53). The notice, sent by the IMG 20, contains the new software component ID, the version thereof, and charging information of the new software component.

After the notice from the IMG 20 is received, the BRK 40 registers the new software component of the IMG 20 to the management system as the charged object (S54). Specifically, the BRK 40 overwrites the corresponding items of the image input/output device information and the software component information, retained by the BRK 40 as shown in FIG. 5, based on the new information contained in the received notice. After the charging information is updated, the BRK 40 transmits a notice of the end of the software component upgrading process to the SC 10 (S55). The notice, sent by the BRK 40, contains the user ID, the device ID and the new software component ID.

Figure 11:
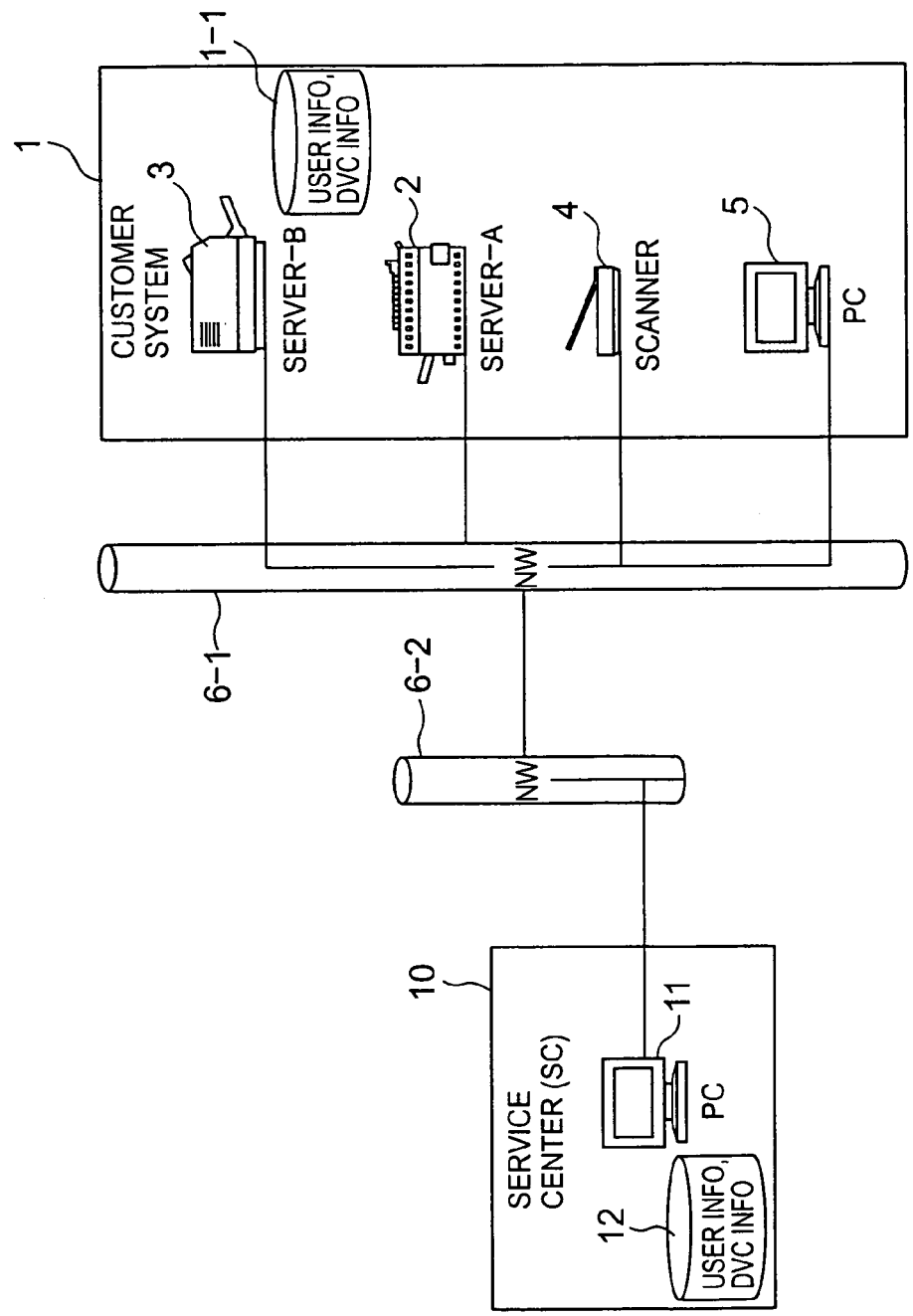
FIG. 11 is a block diagram of a second preferred embodiment of the charging process management system of the invention.

Next, FIG. 11 shows a configuration of a second preferred embodiment of the charging process management system of the invention. In FIG. 11, the elements which are essentially the same as corresponding elements in FIG. 1 are designated by the same reference numerals, and a description thereof will be omitted.

As shown in FIG. 11, in the charging process management system of the present embodiment, the customer system 1 generally includes the plurality of image input/output devices 2, 3 and 4, and the personal computer (PC) 5, which are connected to the first network (NW) 6-1. Specifically, in the present embodiment, the image input/output device 2 is a server-A which may be a copier, the image input/output device 3 is a server-B which may be a printer, and the image input/output device 4 is a scanner. These image input/output devices 2 through 4 of the customer system 1 are operated in accordance with the software components of each corresponding device. Further, the customer system 1 includes a storage device 1-1, and this storage device 1-1 stores user information and image input/output device information as shown in FIG. 5.

In the charging process management system of FIG. 1, the service center (SC) 10 includes the personal computer (PC) 11, which is connected to the second network (NW) 6-2. The first network 6-1 and the second network 6-2 are connected together, and the PC 11 of the SC 10 is connected to the individual image input/output devices 2 through 4 of the customer system 1 through the first network 6-1 and the second network 6-2. By communicating with the customer system 1, the SC 10 remotely provides operational and message services for the individual image input/output devices 2 through 4 of the customer system 1.

Further, the SC 10 includes a storage device 12 which stores user information and image input/output device information as shown in FIG. 5. The SC 10 manages user information related to the respective image input/output devices 2 through 4 of the customer system 1, in addition to the existing system information.

In the present embodiment, by using the management information stored in the storage devices 1-1 and 12, the SC 10 provides registration and management functions of respective user IDs, each user ID indicating a specific one of registered users for one of the software components of the image input/output devices 2 through 4 in the customer system 1.

In the charging process management system of the present embodiment, the hardware of each of the image input/output devices 2 through 4 of the customer system 1 is configured in the same manner as that of the IMG 20 shown in FIG. 2. The software of each of the image input/output devices 2 through 4 of the customer system 1 is configured in the same manner as that shown in FIG. 3.

Figure 12:
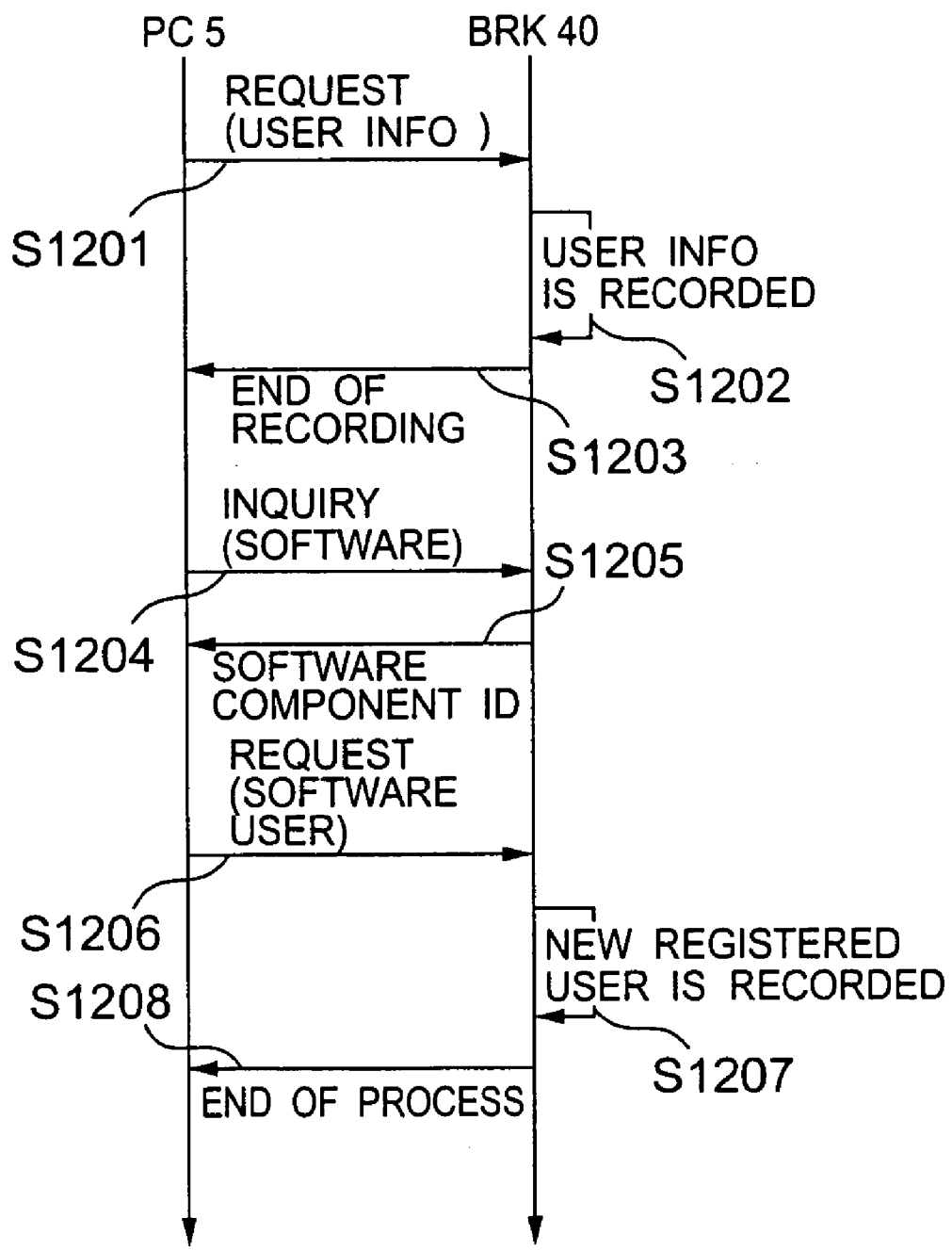
FIG. 12 is a diagram for explaining a communication sequence of the personal computer and the broker in the charging process management system of the present embodiment.

FIG. 12 shows a communication sequence of the personal computer (the PC 5) and the broker (the BRK 40) in the charging process management system of the present embodiment when adding a new registered user of one of the software components of a corresponding image input/output device (which will be called the IMG 20) to the management system.

As shown in FIG. 12, in the present embodiment, when adding a new registered user of one of the software components to the management system, the PC 5 transmits a new registered user addition request to the BRK 40 (S1201). The transmitted request contains user information related to the new registered user. The BRK 40 receives the request from the PC 5, checks the user information contained in the request, and records the user information on the database 45 (S1202). The BRK 40 transmits a notice of the end of recording of the user information to the PC 5 (S1203).

When the notice from the BRK 40 is received, the PC 5 transmits a software component inquiry to the BRK 40 (S1204). This inquiry is sent by the PC 5 in order for the user of the PC 5 to know what kind of the software component is available from the IMG 20 for the software user registration.

After the inquiry from the PC 5 is received, the BRK 40 transmits a notice of the available software component to the PC 5 (S1205). The notice, sent by the BRK 40, contains the software component ID and the related software component information. When the notice from the BRK 40 is received and the received notice contains a desired software component, the PC 5 transmits a software user registration request to the BRK 40 (S1206).

After the request from the PC 5 is received, the BRK 40 records a new registered user of the related software component of the IMG 20 on the database 45 (S1207). After the recording of the new registered user is performed, the BRK 40 transmits a notice of the end of the new registered user addition process to the PC 5 (S1208).

Figure 13:
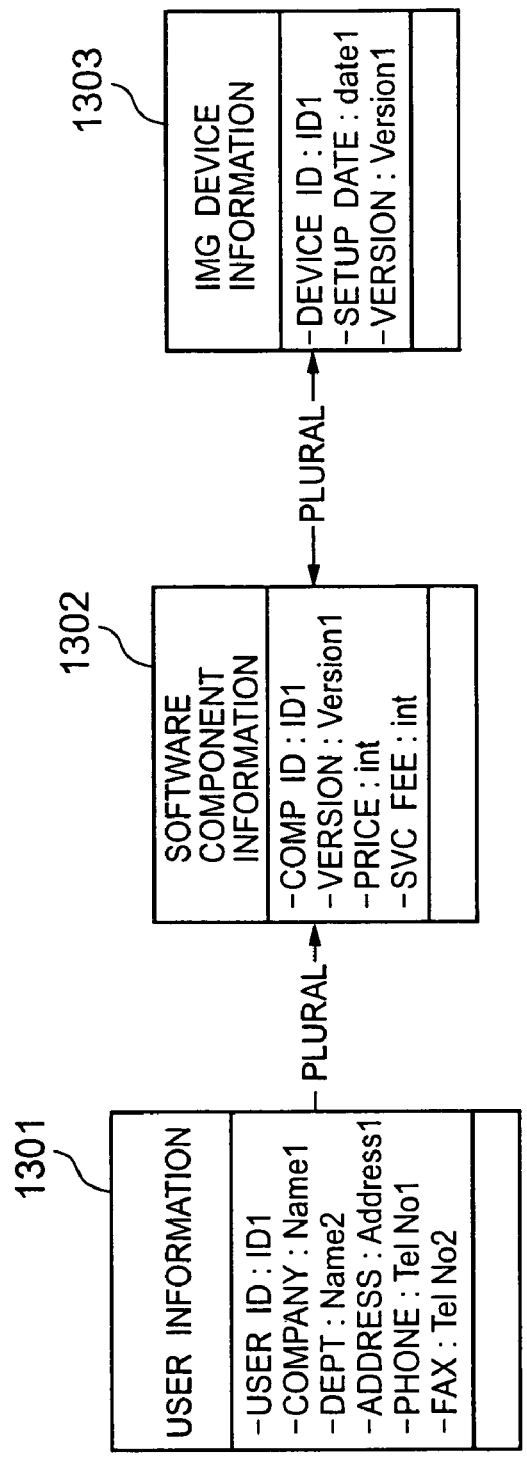
FIG. 13 is a diagram for explaining a structure of user information used by the charging process management system of the present embodiment when the communication sequence of FIG. 12 is performed.

FIG. 13 shows a structure of management information retained on the database 45 by the broker 40 of the charging process management system of the present embodiment when the communication sequence of FIG. 12 is performed.

As shown in FIG. 13, the BRK 40 retains user information 1301, image input/output device information 1302, and software component information 1303 in order for the charging process management. In the present embodiment, the user information 1301 includes a user ID field (ID1), a company name field (Name1), a department name field (Name2), an address field (Address1), a telephone number field (TelNo1), and a fax number field (TelNo2). Hereinafter, the notations in parentheses show examples of the actual data contained in the respective fields.

In the management information of FIG. 13, the image input/output device information 1303 includes a device ID field (ID1), a setup date field (date1), and a version number field (Version1). The software component information 1302 includes a component ID field (ID1), a version number field (Version1), a price field (int), and a current service fee field (int).

Normally, in the management information of FIG. 13, a plurality of items of software component information 1302 are created with respect to a single item of user information 1301, and a plurality of items of image input/output device information 1303 are created with respect to the plurality of items of software component information 1302.

Figure 14:
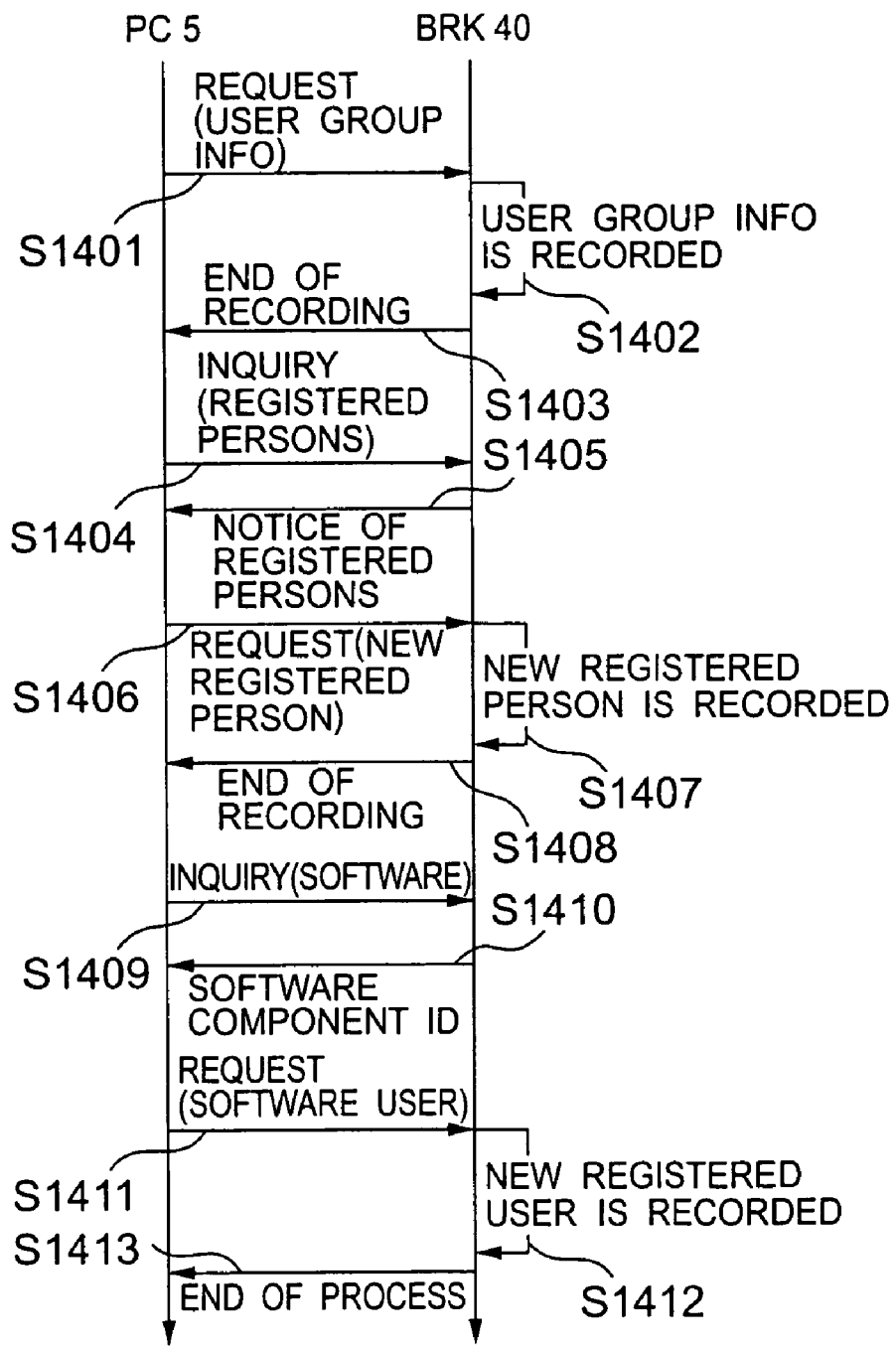
FIG. 14 is a diagram for explaining a communication sequence of the personal computer and the broker in the charging process management system of the present embodiment.

FIG. 14 shows another communication sequence of the personal computer (the PC 5) and the broker (the BRK 40) in the charging process management system of the present embodiment when adding a new registered user of one of the software components of a corresponding image input/output device (which will be called the IMG 20) to the management system.

As shown in FIG. 14, in the present embodiment, when adding a new registered user of one of the software components to the management system, the PC 5 transmits a new registered user group addition request to the BRK 40 (S1401). The transmitted request contains user information related to the new registered user group. The BRK 40 receives the request from the PC 5, checks the user information contained in the request, and records the user information of the new registered user group on the database 45 (S1402). The BRK 40 transmits a notice of the end of recording of the user information to the PC 5 (S1403).

When the notice from the BRK 40 is received, the PC 5 transmits a registered person inquiry to the BRK 40 (S1404). This inquiry is sent by the PC 5 in order for the user of the PC 5 to know who are already included in the registered persons of the user group of the IMG 20.

After the inquiry from the PC 5 is received, the BRK 40 transmits a notice of the registered persons of the user group to the PC 5 (S1405). The notice, sent by the BRK 40, contains a list of the names of the registered persons of the user group and the related user information. When the notice from the BRK 40 is received, the PC 5 transmits a new registered person request to the BRK 40 (S1406).

After the request from the PC 5 is received, the BRK 40 records a new registered person of the related user group of the IMG 20 on the database 45 (S1407). After the recording of the new registered person is performed, the BRK 40 transmits a notice of the end of the recording of the new registered person to the PC 5 (S1408).

When the notice from the BRK 40 is received, the PC 5 transmits a software component inquiry to the BRK 40 (S1409). This inquiry is sent by the PC 5 in order for the user of the PC 5 to know what kind of the software component is available from the IMG 20 for the software user registration.

After the inquiry from the PC 5 is received, the BRK 40 transmits a notice of the available software component to the PC 5 (S1410). The notice, sent by the BRK 40, contains the software component ID and the related software component information. When the notice from the BRK 40 is received and the received notice contains a desired software component, the PC 5 transmits a software user registration request to the BRK 40 (S1411).

After the request from the PC 5 is received, the BRK 40 records the new registered person of the related software component of the IMG 20 on the database 45 (S1412). After the recording of the new registered user is performed, the BRK 40 transmits a notice of the end of the new registered user addition process to the PC 5 (S1413).

Figure 15:
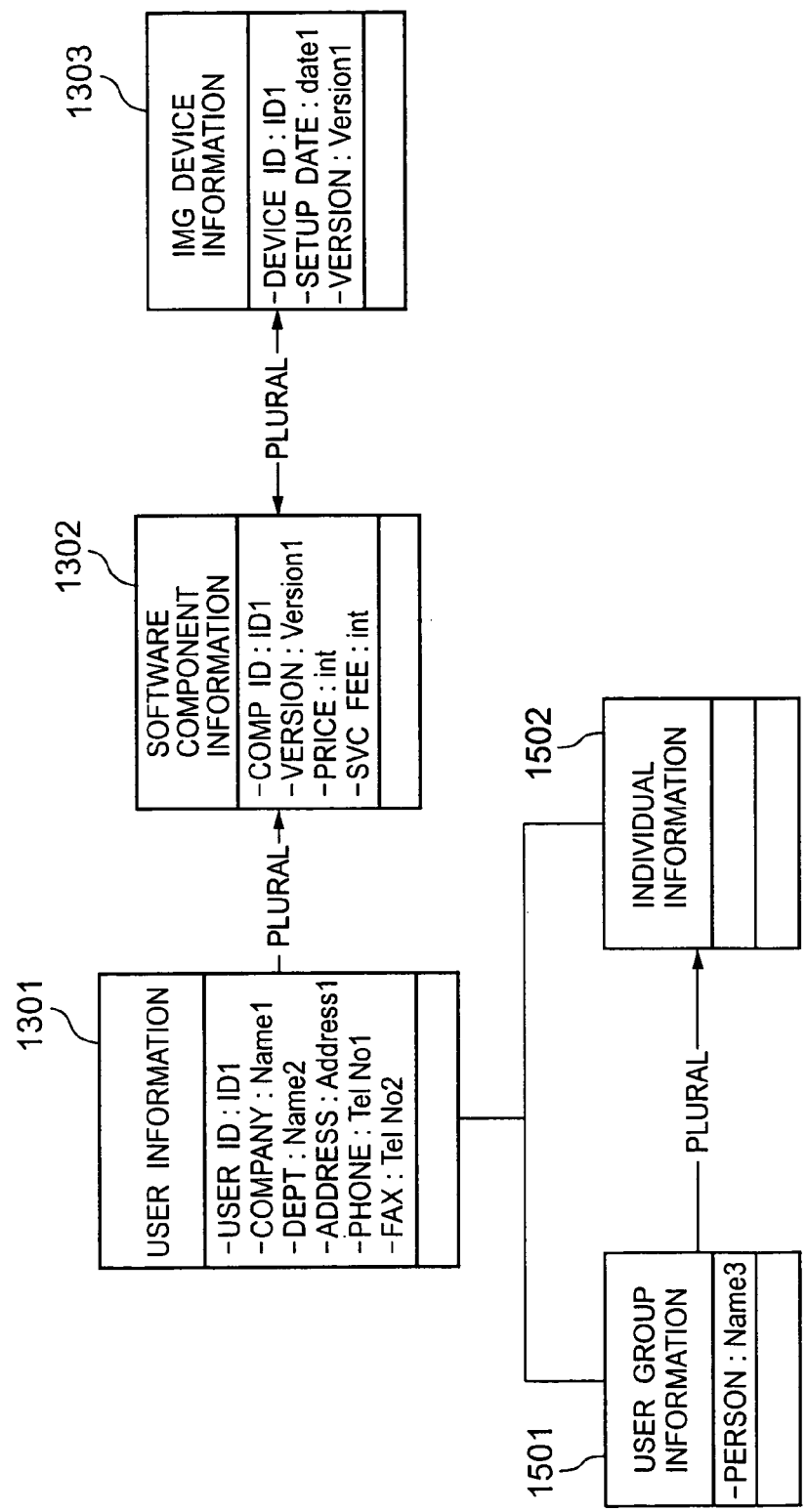
FIG. 15 is a diagram for explaining a structure of user information used by the charging process management system of the present embodiment when the communication sequence of FIG. 14 is performed.

FIG. 15 shows a structure of management information retained on the database 45 by the broker 40 of the charging process management system of the present embodiment when the communication sequence of FIG. 14 is performed.

The management information of FIG. 15 is essentially the same as the management information of FIG. 13 except that the user information 1301 in the case of FIG. 15 is correlated to either user group information 1501 or individual information 1502. A duplicate description will be omitted.

Figure 16:
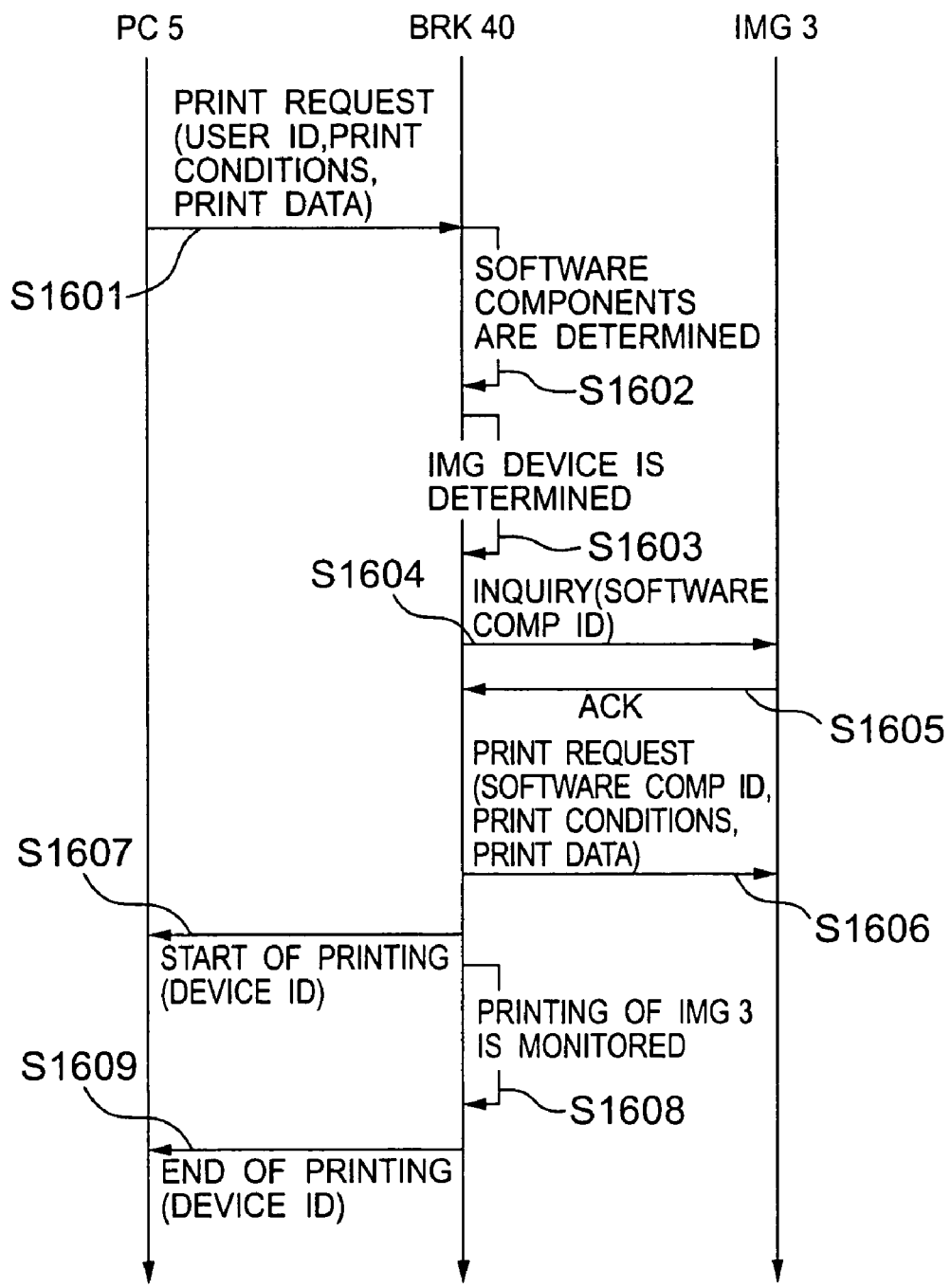
FIG. 16 is a diagram for explaining a communication sequence of the personal computer, the broker and the image input/output device in the charging process management system of the present embodiment.

FIG. 16 shows a communication sequence of the personal computer (the PC 5), the broker (the BRK 40) and the image input/output device (the IMG 3) in the charging process management system of the present embodiment.

In the present embodiment, each of the registered users is allowed to execute an image input/output function of a corresponding one of the image input/output devices 2 through 4 of the customer system 1 by using the software components of the corresponding image input/output device which are registered to the broker 40 with a corresponding user ID. For the sake of description, in the communication sequence of FIG. 16, the image input/output device 3 (the server-B) is used as a print server, and this print server will be called the IMG 3.

As shown in FIG. 16, in the present embodiment, the PC 5 (or one of the registered users) transmits a print request to the BRK 40 (S1601). The print request, sent by the PC 5, contains a user ID which indicates one of the registered users on the BRK 40, print conditions which are needed to execute a desired print function, and print data which is actually printed on paper. After the print request from the PC 5 is received, the BRK 40 determines suitable software components in accordance with the print conditions of the print request when the user ID of the print request matches with one of the registered users (S1602). The BRK 40 determines the suitable image input/output device (or the IMG 3) in accordance with the determined software components (S1603).

After the IMG 3 is determined, the BRK 40 transmits a software component inquiry to the IMG 3 (S1604). The inquiry, sent by the BRK 40, contains the determined software component IDs. Based on the response from the IMG 3, it is determined at the BRK 3 whether the requested software components of the IMG 3, indicated by the software component IDs, are currently available to the print request.

When the inquiry from the BRK 40 is received and the requested software components are available, the IMG 3 transmits an acknowledgement signal (ACK) to the BRK 40 (S1605). After the response (ACK) from the IMG 3 is received, the BRK 40 transmits a print request, including the print condition, the print data and the determined software component IDs, to the IMG 3 (S1606).

When the print request from the BRK 40 is received, the IMG 3 starts execution of the requested printing. On the other hand, the BRK 40 transmits a notice of the start of the printing of the IMG 3 to the PC 5 (S1607). The notice, sent by the BRK 40, includes the device ID of the IMG 3. The BRK 40 monitors the execution of the requested printing by the IMG 3 (S1608). After the execution of the printing is finished, the BRK 40 transmits a notice of the end of the printing of the IMG 3 to the PC 5 (S1609). The notice, sent by the BRK 40, includes the device ID of the IMG 3.

Figure 17:
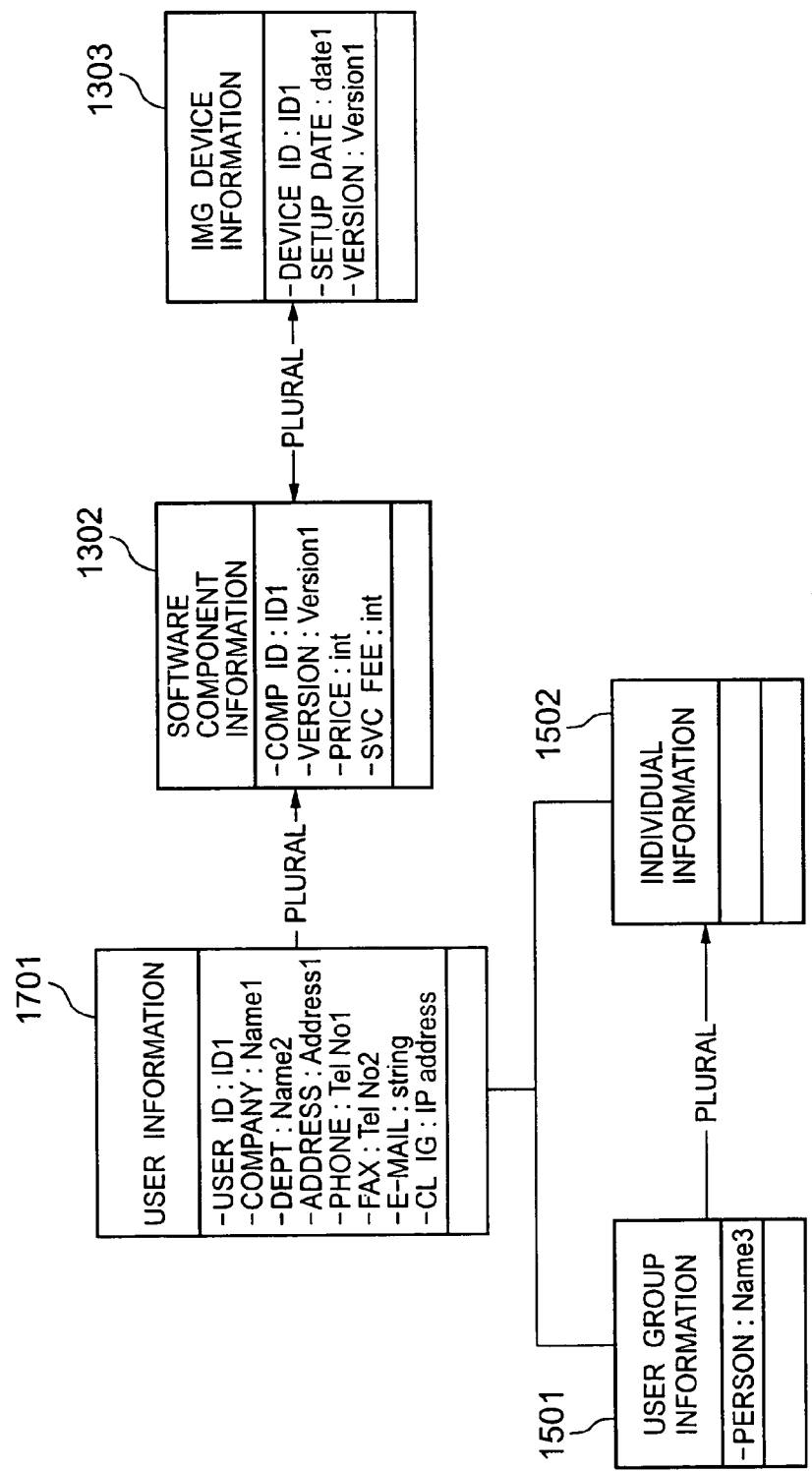
FIG. 17 is a diagram for explaining a structure of user information used by a third preferred embodiment of the charging process management system of the invention.

Next, FIG. 17 shows a structure of management information retained on the database 45 by the broker 40 of a third preferred embodiment of the charging process management system of the invention.

The charging process management system of the present embodiment is configured in the same manner as that of the previous embodiment shown in FIG. 11, and a description thereof will be omitted.

In the present embodiment, by using the management information stored in the storage devices 1-1 and 12, the SC 10 provides registration and management functions of respective user IDs, each user ID indicating a specific one of registered users for one of the software components of the image input/output devices 2 through 4 in the customer system 1.

In the charging process management system of the present embodiment, the hardware of each of the image input/output devices 2 through 4 of the customer system 1 is configured in the same manner as that of the IMG 20 shown in FIG. 2. The software of each of the image input/output devices 2 through 4 of the customer system 1 is configured in the same manner as that shown in FIG. 3. A duplicate description thereof will be omitted.

The management information of FIG. 17 is essentially the same as the management information of FIG. 17 except that user information 1701 shown in FIG. 17 differs from the user information 1301 shown in FIG. 15. Namely, the user information 1701 in the present embodiment includes the user ID field (ID1), the company name field (Name1), the department name field (Name2), the address field (Address1), the telephone number field (TelNo1), the fax number field (TelNo2), and a client ID field (IP address). Hereinafter, the notations in parentheses show examples of the actual data contained in the respective fields.

The user information 1701 is correlated to either the user group information 1501 or the individual information 1502.

Figure 18:
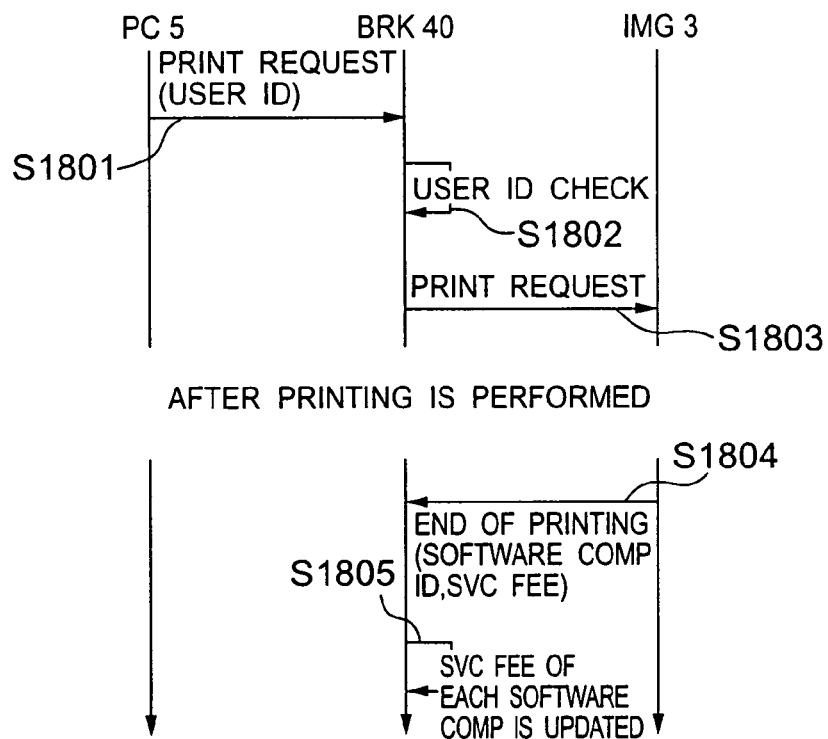
FIG. 18 is a diagram for explaining a communication sequence of the personal computer, the broker and the image input/output device in charging process management system of the present embodiment.

FIG. 18 shows another communication sequence of the personal computer (the PC 5), the broker (the BRK 40) and the image input/output device (the IMG 3) in the charging process management system of the present embodiment.

In the present embodiment, when one of the software components of a corresponding image input/output device (which will be called the IMG 3) is used by one of the registered users, the BRK 40 identifies that registered user by using the corresponding user ID, and updates the charging information of that registered user according to the use condition of that software component.

As shown in FIG. 18, in the communication sequence of the present embodiment, the PC 5 transmits a print request to the BRK 40 (S1801). The print request, sent by the PC 5, contains a user ID which indicates one of the registered users. When the print request from the PC 5 is received, the BRK 40 determines whether the user ID of the received request matches with one of the registered users in the database 45 (S1802). When there is a match, the BRK 40 transmits the print request to the IMG 3 (S1803).

After the printing is performed on the IMG 3 based on the print request, the IMG 3 transmits a notice of the end of the printing to the BRK 40 (S1804). The notice, sent by the IMG 3, contains the software component IDs which indicate the software components of the IMG 3 used for the printing process, and the respective service fees of the software components used. After the notice from the IMG 3 is received, the BRK 40 updates the management information of the database 45 according to the contents of the received notice and updates the charging information of that registered user according to the use condition of each of the software components of the IMG 3 (S1805).

Figure 19:
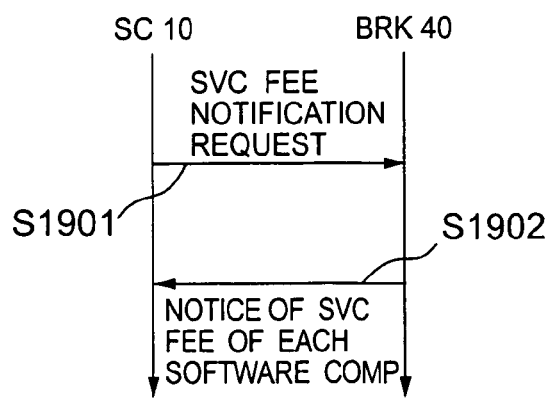
FIG. 19 is a diagram for explaining a communication sequence of the service center and the broker in the charging process management system of the present embodiment.

FIG. 19 shows another communication sequence of the service center (the SC 10) and the broker (the BRK 40) in the charging process management system of the present embodiment.

In the present embodiment, the BRK 40 is configured to transmit a notice of service sees to the SC 10 when a service fee notification request from the SC 10 is received.

As shown in FIG. 19, in the communication sequence of the present embodiment, the SC 10 transmits a service fee notification request to the BRK 40 (S1901). This request is sent to the BRK 40 from the SC 10 at intervals of, for example, one month. When the service fee notification request from the SC 10 is received, the BRK 40 transmits a notice of service fees to the SC 10. The service fee notice at this time is created at the BRK 40 based on the management information of the database 45 as shown in FIG. 17. The notice, sent by the BRK 40, contains the respective service fees of the software components with respect to each of the registered users.

Figure 20:
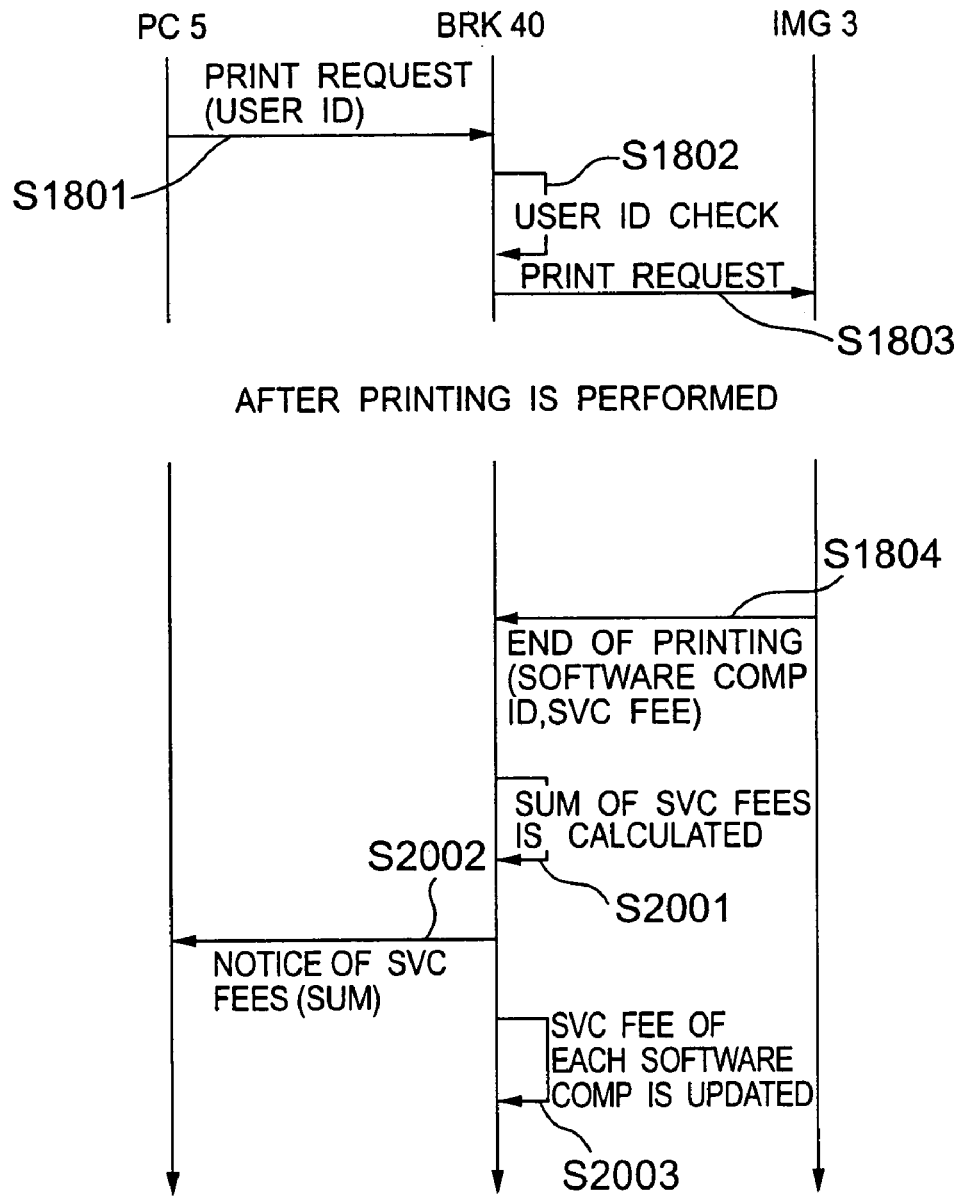
FIG. 20 is a diagram for explaining a communication sequence of the personal computer, the broker and the image input/output device in the charging process management system of the present embodiment.

FIG. 20 shows another communication sequence of the personal computer (the PC 5), the broker (the BRK 40) and the image input/output device (the IMG 3) in the charging process management system of the present embodiment.

In the present embodiment, the BRK 40 is configured to transmit a notice of service fees to the PC 5 of the customer system 1 every time the software components are used by the registered users.

As shown in FIG. 20, in the communication sequence of the present embodiment, the steps S1801 through S1804 are essentially the same as corresponding steps in the previous embodiment of FIG. 18. The PC 5 transmits a print request to the BRK 40 (S1801). The print request, sent by the PC 5, contains a user ID which indicates one of the registered users. When the print request from the PC 5 is received, the BRK 40 determines whether the user ID of the received request matches with one of the registered users in the database 45 (S1802). When there is a match, the BRK 40 transmits the print request to the IMG 3 (S1803).

After the printing is performed on the IMG 3 based on the print request, the IMG 3 transmits a notice of the end of the printing to the BRK 40 (S1804). The notice, sent by the IMG 3, contains the software component IDs which indicate the software components of the IMG 3 used for the printing process, and the respective service fees of the software components used.

After the notice from the IMG 3 is received, the BRK 40 calculates a sum of service fees of that registered user according to the respective use conditions of the software components of the IMG 3 used for the printing process (S2001). The BRK 40 transmits a notice of service fees, containing the calculated sum, to the PC 5 (S2002). On the other hand, the BRK 40 updates the management information of the database 45 according to the contents of the received notice (S2003).

Figure 21:
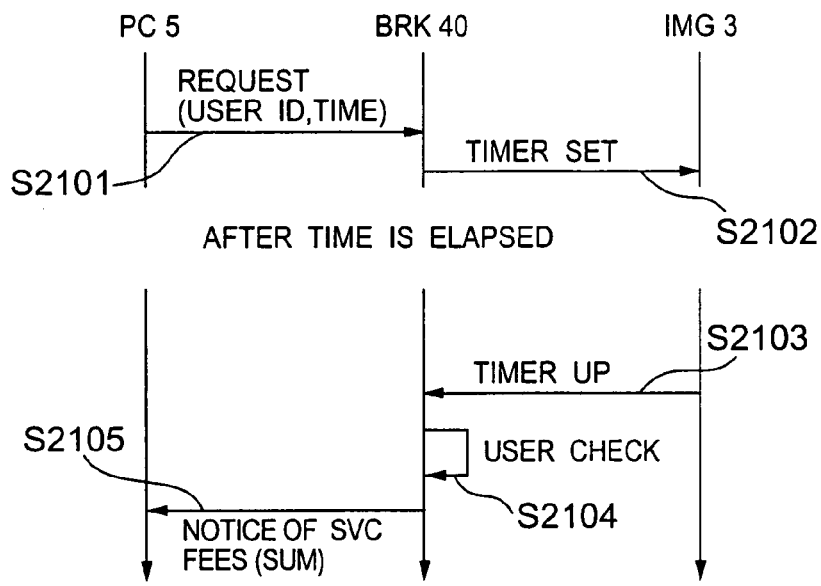
FIG. 21 is a diagram for explaining a communication sequence of the personal computer, the broker and the image input/output device in the charging process management system of the present embodiment.

FIG. 21 shows another communication sequence of the personal computer (the PC 5), the broker (the BRK 40) and the image input/output device (the IMG 3) in the charging process management system of the present embodiment.

In the present embodiment, one of the image input/output devices 2 through 4 (which will be called the IMG 3) of the customer system 1 is provided with a timer. If a predetermined time (for example, one month) is set in the timer of the IMG 3, the IMG 3 transmits a notice of the time up of the predetermined time to the BRK 40 every time the predetermined time has elapsed. The BRK 40 in the present embodiment is configured to transmit a notice of the service fees of the IMG 3 to the PC 5 every time the notice from the timer is received (or at intervals of the predetermined time).

Figure 22:
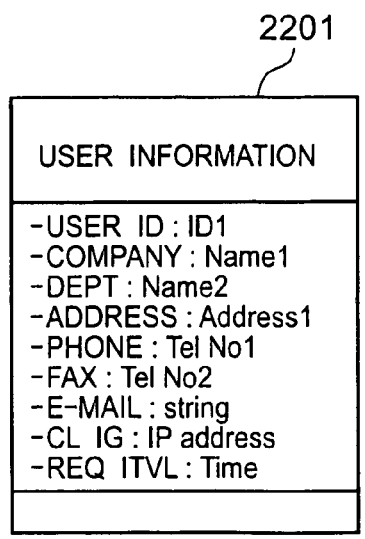
FIG. 22 is a diagram for explaining a structure of user information used by the system when the communication sequence of FIG. 21 is performed.

FIG. 22 shows a structure of user information 2201 retained on the database 45 by the broker 40 of the charging process management system of the present embodiment when the communication sequence of FIG. 21 is performed.

The user information 2201 shown in FIG. 22 is essentially the same as the user information 1701 shown in FIG. 17 except that the user information 2201 of FIG. 22 further includes a service fee notice interval "SVC ITVL" field (Time), in addition to the data elements of the user information 1701 shown in FIG. 17. The software component information 1302 and the image input/output device information 1303 in the present embodiment are essentially the same as corresponding elements in FIG. 17.

In the communication sequence of FIG. 21, the PC 5 transmits a timer set request to the BRK 40 (S2101). The request, sent by the PC 5, includes a user ID which indicates one of the registered users, and a predetermined time which determines a service fee notice interval (SVC ITVL) to be set in the timer of the IMG 3. When the request from the PC 5 is received, the BRK 40 stores the SVC ITVL of the received request into the user information 2201 of the database 45. After the SVC ITVL is stored into the user information 2201, the BRK 40 transmits a timer set command to the timer of the IMG 3 (S2102).

After the predetermined time has elapsed, the IMG 3 transmits a notice of the time up of the predetermined time to the BRK 40 (S2103). After the notice from the IMG 3 is received, the BRK 40 reads out the related user information 2201 (which has the user ID) from the database 45 of the BRK 40 (S2104). After the related user information 2201 is read out, the BRK 40 transmits a notice of the service fees of the IMG 3 (a sum of the respective service fees of the software components) to the PC 5 (S2105).

The present invention is not limited to the above-described embodiments, and variations and modifications may be made without departing from the scope of the present invention.

Further, the present invention is based on Japanese priority application No. 2000-061044, filed on Mar. 6, 2000, the entire contents of which are hereby incorporated by reference.

What is claimed is:

1. A charging process management system comprising:
a plurality of image input/output devices connected to a network, each image input/output device having a plurality of copier, fax and printer software components that are charged for service fees;
a broker connected to the plurality of image input/output devices through the network, the broker providing integrated management and services to the image input/output devices; and
a service center connected to the broker through the network, the service center collecting charging information through the broker, the charging information being generated according to respective use conditions of the copier, fax and printer software components of the image input/output devices,
wherein the service center provides registration and management functions of user identifications, and the broker retains user information, image input/output device information and copier, fax and printer software information, which are registered to the broker, and a plurality of items of the copier, fax and printer software component information associated with a single item of the user information and a plurality of items of the image input/output device information associated with the plurality of items of the copier, fax and printer software component information,
wherein each of the registered users is allowed to execute any copier, fax and printer function of a corresponding one of the image input/output devices by using the software components registered to the broker with a corresponding user identification, and
wherein when one of the copier, fax and printer software components is used by one of the registered users the broker identifies said one of the registered users by using the corresponding user identification and updates the charging information of said one of the registered users according to the use conditions of said one of the copier, fax and printer software components.

2. The charging process management system according to claim 1, wherein each of the registered users is correlated with a user group of registered persons.

3. The charging process management system according to claim 1, wherein the service center transmits a request to the broker when adding a new image input/output device to the management system, so that one or a plurality of software components of the new image input/output device are registered to the broker as charged objects.

4. The charging process management system according to claim 1, wherein, when adding a new image input/output device to the management system, the new image input/output device transmits a request to the broker so that one or a plurality of software components of the new image input/output device are registered to the broker as charged objects.

5. The charging process management system according to claim 1, wherein the service center transmits a request to the broker when one of the software components is upgraded to a new version and the charging information is varied, so that the broker updates the charging information with respect to the upgraded software component of a corresponding one of the image input/output devices.

6. The charging process management system according to claim 1, wherein, when one of the software components is upgraded to a new version and the charging information is varied, a corresponding one of the image input/output devices transmit a request to the broker, so that the broker updates the charging information with respect to the upgraded software component of the corresponding one of the image input/output devices.

7. The charging process management system according to claim 1, wherein the service center transmits a request to the broker when adding a new software component of a corresponding one of the image input/output devices to the management system, so that the broker updates the charging information with respect to the new software component of the corresponding one of the image input/output devices.

8. The charging process management system according to claim 1, wherein, when adding a new software component of a corresponding one of the image input/output devices to the management system, the corresponding one of the image input/output devices transmits a request to the broker so that the broker updates the charging information with respect to the new software component of the corresponding one of the image input/output devices.

9. The charging process management system according to claim 1, wherein the broker is configured to transmit a notice of service fees to the service center when a notification request from the service center is received.

10. The charging process management system according to claim 1, wherein the broker is configured to transmit a notice of service fees to the customer system every time the software components are used by the registered users.

11. The charging process management system according to claim 1, wherein the broker is configured to transmit a notice of service fees to the customer system at intervals of a predetermined time.

* * * * *